(12) United States Patent
Jaganathan et al.

(10) Patent No.: US 11,484,821 B2
(45) Date of Patent: Nov. 1, 2022

(54) FILTER MEDIA INCLUDING ADHESIVES

(71) Applicant: Hollingsworth & Vose Company, East Walpole, MA (US)

(72) Inventors: Sudhakar Jaganathan, Northborough, MA (US); Douglas M. Guimond, Pepperell, MA (US); Carrie Liu, Hudson, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 17/137,959

(22) Filed: Dec. 30, 2020

(65) Prior Publication Data

US 2021/0291094 A1    Sep. 23, 2021

Related U.S. Application Data

(63) Continuation of application No. 15/380,996, filed on Dec. 15, 2016, now Pat. No. 10,898,838.

(51) Int. Cl.
*B01D 39/14* (2006.01)
*B01D 46/62* (2022.01)
(Continued)

(52) U.S. Cl.
CPC .......... *B01D 39/14* (2013.01); *B01D 39/163* (2013.01); *B01D 39/18* (2013.01);
(Continued)

(58) Field of Classification Search
None
See application file for complete search history.

(56) References Cited

U.S. PATENT DOCUMENTS

| 4,093,437 A | 6/1978 | Ichihara et al. |
| 4,892,667 A | 1/1990 | Parker, III et al. |

(Continued)

FOREIGN PATENT DOCUMENTS

| CN | 1141598 A | 1/1997 |
| CN | 1226199 A | 8/1999 |

(Continued)

OTHER PUBLICATIONS

U.S. Appl. No. 16/582,483, filed Sep. 25, 2019, Guimond et al.
(Continued)

*Primary Examiner* — Jason M Greene
(74) *Attorney, Agent, or Firm* — Wolf, Greenfield & Sacks, P.C.

(57) ABSTRACT

Articles and methods involving filter media are generally provided. In certain embodiments, the filter media includes at least a first layer, a second layer, and an adhesive resin positioned between the first layer and the second layer. In some embodiments, the first layer may be a pre-filter layer or a support layer. The second layer may, for example, comprise fibers formed by a solution spinning process and/or may comprise fine fibers. In some embodiments, the adhesive resin may be present in a relatively low amount and/or may have a low glass transition temperature. The filter media as a whole may have one or more advantageous properties, including one or more of a high stiffness, a high bond strength between the first layer and the second layer, a high gamma, and/or a low increase in air resistance after being subjected to an IPA vapor discharge. The filter media may be, for example, a HEPA filter and/or an ULPA filter.

22 Claims, 5 Drawing Sheets

(51) Int. Cl.
    *B01D 39/16*         (2006.01)
    *B01D 39/18*         (2006.01)
    *B01D 39/20*         (2006.01)
    *B01D 46/00*         (2022.01)

(52) U.S. Cl.
    CPC ..... *B01D 39/2024* (2013.01); *B01D 46/0001* (2013.01); *B01D 46/62* (2022.01); *B01D 2239/0208* (2013.01); *B01D 2239/0457* (2013.01); *B01D 2239/0464* (2013.01); *B01D 2239/083* (2013.01); *B01D 2239/1225* (2013.01); *B01D 2239/1233* (2013.01); *B01D 2239/1266* (2013.01); *B01D 2239/1275* (2013.01); *B01D 2239/1291* (2013.01); *B01D 2265/04* (2013.01)

(56) References Cited

U.S. PATENT DOCUMENTS

| | | |
|---|---|---|
| 5,108,827 A | 4/1992 | Gessner |
| 5,580,459 A | 12/1996 | Powers et al. |
| 5,672,399 A | 9/1997 | Kahlbaugh et al. |
| 5,785,725 A | 7/1998 | Cusick et al. |
| 5,993,501 A | 11/1999 | Cusick et al. |
| 6,007,608 A | 12/1999 | Johnson |
| 6,165,572 A * | 12/2000 | Kahlbaugh .......... B01D 46/521 428/36.1 |
| 6,171,369 B1 | 1/2001 | Schultink et al. |
| 6,171,684 B1 | 1/2001 | Kahlbaugh et al. |
| 6,174,964 B1 | 1/2001 | Jariwala et al. |
| 6,214,094 B1 | 4/2001 | Rousseau et al. |
| 6,521,321 B2 | 2/2003 | Kahlbaugh et al. |
| 6,554,881 B1 | 4/2003 | Healey |
| 6,579,350 B2 | 6/2003 | Doherty |
| 6,740,142 B2 | 5/2004 | Buettner et al. |
| 6,743,273 B2 | 6/2004 | Chung et al. |
| 6,746,517 B2 | 6/2004 | Benson et al. |
| 6,800,117 B2 | 10/2004 | Barris |
| 6,858,057 B2 | 2/2005 | Healey |
| 6,974,490 B2 | 12/2005 | Gillingham et al. |
| 7,008,465 B2 | 3/2006 | Graham et al. |
| 7,097,694 B1 | 8/2006 | Jaroszczyk et al. |
| 7,137,510 B1 | 11/2006 | Klein et al. |
| 7,235,122 B2 | 6/2007 | Bryner et al. |
| 7,314,497 B2 | 1/2008 | Kahlbaugh et al. |
| 7,316,723 B2 | 1/2008 | Chung et al. |
| 7,754,123 B2 | 7/2010 | Verdegan et al. |
| 7,789,930 B2 | 9/2010 | Ensor et al. |
| 7,922,959 B2 | 4/2011 | Jones et al. |
| 7,927,540 B2 | 4/2011 | Smithies et al. |
| 7,998,885 B2 | 8/2011 | Conley et al. |
| 8,029,588 B2 | 10/2011 | Chung et al. |
| 8,057,567 B2 | 11/2011 | Webb et al. |
| 8,083,828 B2 | 12/2011 | Smith et al. |
| 8,172,092 B2 | 5/2012 | Green et al. |
| 8,187,520 B2 | 5/2012 | Takano et al. |
| 8,257,459 B2 | 9/2012 | Healey et al. |
| 8,303,693 B2 | 11/2012 | Leung |
| 8,308,834 B2 | 11/2012 | Smithies et al. |
| 8,357,220 B2 | 1/2013 | Guimond et al. |
| 8,361,180 B2 | 1/2013 | Lim et al. |
| 8,366,797 B2 | 2/2013 | Chung et al. |
| 8,394,155 B2 | 3/2013 | Kohli et al. |
| 8,445,597 B2 | 5/2013 | Tomita |
| 8,512,569 B2 | 8/2013 | Eaton et al. |
| 8,523,971 B2 | 9/2013 | Leung et al. |
| 8,545,587 B2 | 10/2013 | Guimond et al. |
| 8,590,712 B2 | 11/2013 | Wieczorek et al. |
| 8,608,817 B2 | 12/2013 | Wertz et al. |
| 8,679,216 B2 | 3/2014 | Schelling et al. |
| 8,950,587 B2 | 2/2015 | Thomson et al. |
| 8,978,899 B2 | 3/2015 | Ferrer et al. |
| 9,504,945 B2 | 11/2016 | Crabtree et al. |
| 9,950,284 B2 | 4/2018 | Thomson et al. |
| 10,252,200 B2 | 4/2019 | Anantharamaiah et al. |
| 10,343,095 B2 | 7/2019 | Jaganathan et al. |
| 10,543,441 B2 | 1/2020 | Jaganathan et al. |
| 10,682,595 B2 | 6/2020 | Thomason et al. |
| 11,014,030 B2 | 5/2021 | Zhang et al. |
| 11,123,668 B2 | 9/2021 | Anantharamaiah et al. |
| 11,167,232 B2 | 11/2021 | Jaganathan et al. |
| 2002/0083837 A1 | 7/2002 | Doherty |
| 2003/0203696 A1 | 10/2003 | Healey |
| 2004/0011362 A1 | 1/2004 | Angadjivand et al. |
| 2004/0118765 A1 | 6/2004 | Yavorsky et al. |
| 2005/0148261 A1 | 7/2005 | Close et al. |
| 2005/0235619 A1 | 10/2005 | Heinz et al. |
| 2006/0137317 A1 | 6/2006 | Bryner et al. |
| 2006/0292947 A1 | 12/2006 | LaVietes et al. |
| 2007/0039300 A1 | 2/2007 | Kahlbaugh et al. |
| 2007/0166540 A1 | 7/2007 | Baba et al. |
| 2007/0220852 A1 | 9/2007 | Lifshutz et al. |
| 2008/0017038 A1 | 1/2008 | Wu |
| 2008/0022642 A1 | 1/2008 | Fox et al. |
| 2008/0029449 A1 | 2/2008 | Dewaele et al. |
| 2008/0069991 A1 | 3/2008 | Kohli et al. |
| 2008/0120954 A1 | 5/2008 | Duello et al. |
| 2008/0202078 A1 | 8/2008 | Healey et al. |
| 2008/0245037 A1 | 10/2008 | Rogers et al. |
| 2009/0039013 A1 | 2/2009 | Sakadume et al. |
| 2009/0044702 A1 | 2/2009 | Adamek et al. |
| 2009/0120048 A1 | 5/2009 | Wertz et al. |
| 2009/0272084 A1 | 11/2009 | Healey et al. |
| 2010/0000411 A1 | 1/2010 | Wertz et al. |
| 2010/0187171 A1 | 7/2010 | Gupta |
| 2010/0212272 A1 | 8/2010 | Sealey et al. |
| 2010/0233048 A1 | 9/2010 | Dallas et al. |
| 2010/0252510 A1 | 10/2010 | Godsay et al. |
| 2011/0114554 A1 | 5/2011 | Li et al. |
| 2011/0147320 A1 | 6/2011 | Sealey et al. |
| 2011/0259813 A1 * | 10/2011 | Wertz .................. B01D 39/163 264/510 |
| 2012/0012523 A1 | 1/2012 | Canonico et al. |
| 2012/0048797 A1 | 3/2012 | Smith et al. |
| 2012/0152824 A1 | 6/2012 | Cox et al. |
| 2013/0340962 A1 | 12/2013 | Gupta et al. |
| 2014/0060762 A1 | 3/2014 | Guimond et al. |
| 2014/0123613 A1 | 5/2014 | Le Port et al. |
| 2014/0130469 A1 | 5/2014 | Nagy et al. |
| 2014/0331626 A1 | 11/2014 | Nagy et al. |
| 2014/0366732 A1 | 12/2014 | Gao et al. |
| 2015/0013295 A1 | 1/2015 | Uchiyama et al. |
| 2015/0157969 A1 * | 6/2015 | Sealey ............... B01D 39/2024 55/482 |
| 2015/0182885 A1 | 7/2015 | Thomson et al. |
| 2015/0224746 A1 | 8/2015 | Nam et al. |
| 2015/0328565 A1 | 11/2015 | Swaminathan et al. |
| 2016/0051920 A1 | 2/2016 | Sato et al. |
| 2016/0136553 A1 | 5/2016 | Healey et al. |
| 2016/0166961 A1 | 6/2016 | Haberkamp et al. |
| 2016/0175752 A1 | 6/2016 | Jaganathan et al. |
| 2016/0250575 A1 | 9/2016 | Park |
| 2016/0251552 A1 | 9/2016 | Das et al. |
| 2016/0256806 A1 | 9/2016 | Sanders et al. |
| 2016/0279550 A1 | 9/2016 | Agrahari et al. |
| 2016/0303498 A1 | 10/2016 | Docoure et al. |
| 2017/0232371 A1 | 8/2017 | Anantharamaiah et al. |
| 2017/0232372 A1 | 8/2017 | Zhang et al. |
| 2018/0169551 A1 | 6/2018 | Jaganathan et al. |
| 2018/0272255 A1 | 9/2018 | Thomson et al. |
| 2019/0321760 A1 | 10/2019 | Anantharamaiah et al. |
| 2020/0038793 A1 | 2/2020 | Jaganathan et al. |
| 2020/0122070 A1 | 4/2020 | Guimond et al. |
| 2020/0206666 A1 | 7/2020 | Jaganathan et al. |
| 2021/0229010 A1 | 7/2021 | Jaganathan et al. |
| 2021/0236970 A1 | 8/2021 | Zhang et al. |
| 2022/0072462 A1 | 3/2022 | Jaganathan et al. |

(56) References Cited

U.S. PATENT DOCUMENTS

FOREIGN PATENT DOCUMENTS

| CN | 1247485 | A | 3/2000 |
| CN | 101837213 | A | 9/2010 |
| JP | 2013-230453 | A | 11/2013 |
| WO | WO 2011/052865 | A1 | 5/2011 |

OTHER PUBLICATIONS

U.S. Appl. No. 16/504,835, filed Jul. 8, 2019, Jaganathan et al.
U.S. Appl. No. 16/281,428, filed Feb. 21, 2019, Anantharamaiah et al.
U.S. Appl. No. 17/236,084, filed Apr. 21, 2021, Zhang et al.
U.S. Appl. No. 16/729,648, filed Dec. 30, 2019, Jaganathan et al.
U.S. Appl. No. 17/142,710, filed Jan. 6, 2021, Jaganathan et al.
PCT/US2017/066667, Mar. 1, 2018, International Search Report and Written Opinion.
PCT/US2018/024820, Jun. 14, 2018, International Search Report and Written Opinion.
International Search Report and Written Opinion for PCT/US2017/066667 dated Mar. 1, 2018.
International Search Report and Written Opinion for PCT/US2018/024820 dated Jun. 14, 2018.
[No Author Listed], HVAC reference filter. Elmarco. Liberec, Czech Republic. 2013. 4 pages.
U.S. Appl. No. 17/394,983, filed Aug. 5, 2021, Guimond et al.
U.S. Appl. No. 17/475,458, filed Sep. 15, 2021, Jaganathan et al.
U.S. Appl. No. 17/479,023, filed Sep. 20, 2021, Anantharamaiah et al.

\* cited by examiner

FILTER MEDIA INCLUDING ADHESIVES

RELATED APPLICATIONS

This application is a continuation of U.S. application Ser. No. 15/380,996, filed Dec. 15, 2016, which is incorporated herein by reference in its entirety.

FIELD

The present invention relates generally to filter media and, more particularly, to filter media comprising an adhesive.

BACKGROUND

Filter media can be used to remove contamination in a variety of applications. Depending on the application, the filter media may be designed to have different performance characteristics. For example, filter media may be designed to have performance characteristics suitable for HEPA and/or ULPA applications.

In general, filter media can be formed of a web of fibers. For example, the web may include synthetic fibers amongst other components. The fiber web provides a porous structure that permits fluid (e.g., air) to flow through the filter media. Contaminant particles contained within the fluid may be trapped on the fibrous web. Filter media characteristics, such as fiber diameter and basis weight, affect filter performance including filter efficiency, dust holding capacity and resistance to fluid flow through the filter.

Although many types of filter media for filtering particulates from air exist, improvements in the physical and/or performance characteristics of the filter media (e.g., strength, air resistance, efficiency, and high dust holding capacity) would be beneficial.

SUMMARY

Filter media as well as related components and methods associated therewith are provided.

In one set of embodiments, filter media are provided. In some embodiments, a filter media comprises a first layer, a second layer, wherein the second layer is formed of fibers having an average fiber diameter of less than 1 micron, and an adhesive between the first layer and the second layer, wherein the first layer is bonded to the second layer by the adhesive. The filter media has a stiffness of greater than or equal to 200 mg. A bond strength between the first and second layers is greater than or equal to 150 g/in$^2$. The filter media exhibits a gamma value of greater than or equal to 18 at the most penetrating particle size.

In some embodiments, a filter media comprises a first layer, a second layer, wherein the second layer is formed of fibers having an average fiber diameter of less than 1 micron, and an adhesive between the first layer and the second layer. The first layer is bonded to the second layer by the adhesive. The adhesive comprises a solvent-based resin comprising a polymer having a glass transition temperature of less than or equal to 24° C.

In some embodiments, a filter media comprises a first layer, a second layer, wherein the second layer is formed of fibers having an average fiber diameter of less than 1 micron, and an adhesive between the first layer and the second layer. The adhesive between the first layer and the second layer is present in an amount of less than 10 gsm. The first layer is bonded to the second layer by the adhesive. A bond strength between the first and second layers is greater than or equal to 150 g/in$^2$. The filter media exhibits an air resistance increase of less than 50% after subjecting the filter media to an IPA vapor discharge compared to the filter media prior to the IPA vapor discharge.

In another set of embodiments, methods are provided. In some embodiments, a method of fabricating a filter media comprises spraying a composition comprising a solvent-based adhesive resin and a cross-linking agent onto a first layer to form an adhesive-coated first layer, performing a solvent-based spinning process to deposit fibers onto the adhesive-coated first layer, wherein the fibers have an average fiber diameter of less than 1 micron and form a second layer, and laminating the second layer to a third layer such that the third layer is positioned on a side of the second layer opposite the first layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Articles and methods involving filter media are generally provided. In certain embodiments, the filter media includes at least a first layer, a second layer, and an adhesive resin positioned between the first layer and the second layer. In some embodiments, the first layer may be a pre-filter layer or a support layer. The second layer may, for example, comprise fibers formed by a solution spinning process and/or may comprise fine fibers. In some embodiments, the adhesive resin may be present in a relatively low amount and/or may have a low glass transition temperature. The filter media as a whole may have one or more advantageous properties, including one or more of a high stiffness, a high bond strength between the first layer and the second layer, a high gamma value, and/or a low increase in air resistance after being subjected to an IPA vapor discharge. The filter media may be, for example, a HEPA filter media and/or an ULPA filter media.

Methods for fabrication of the filter media described herein are also provided. In some embodiments, the fabrication of the filter media may comprise spraying a composition comprising an adhesive resin onto a first layer to form an adhesive-coated first layer, and performing a solvent-based spinning process to deposit fibers forming a second layer onto the adhesive-coated first layer. The second layer may be a solvent-spun layer such as an electrospun layer. In some embodiments, the second layer may be laminated to a third layer such that the third layer is positioned on a side of the second layer opposite the first layer. Other configurations as well as methods of joining or forming the first, second, and third layers are also possible.

Figure 1A:
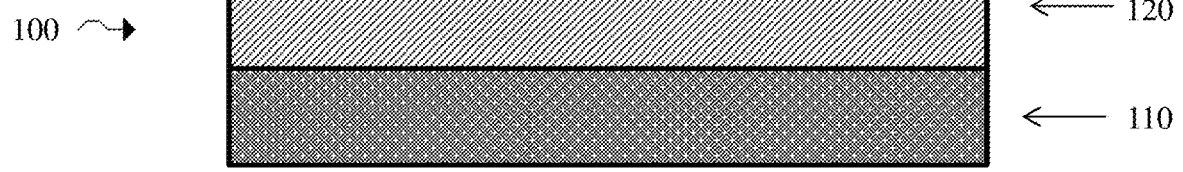
FIG. 1A shows a filter media including two layers according to some embodiments.

FIG. 1A depicts a filter media 100 according to certain embodiments of the invention. Filter media 100 comprises a first layer 110 and a second layer 120. In some embodiments, and as described in more detail below, the first layer is a support layer or a pre-filter layer. The second layer may be a main filter layer. The main filter layer may, for example, have a higher efficiency than one or more other layer(s) of the media. For instance, in some instances the main filter layer is a fine fiber layer, such as a layer formed by a solvent-based spinning process. In some embodiments, an adhesive resin is present between the first layer and the second layer. The adhesive resin may serve to bond the first layer to the second layer. In some embodiments, the adhesive resin may be present in relatively small amounts between the first layer and the second layer but bonding between the first and second layers may be relatively strong (e.g., a bond strength of greater than or equal to 150 g/in$^2$). Properties of layers (e.g., pre-filter layers, support layers, and main filter layers) and adhesives are described in further detail below.

It should be understood that, optionally, the filter media may further comprise additional layers such as a third layer, a fourth layer, and/or a fifth layer, etc. In some embodiments, one or more of the layers (e.g., the first layer, the second layer, the third layer, the fourth layer, the fifth layer), may be added using an in-line process. It should also be appreciated that the orientation of filter media 100 (as well as the other filter media described herein) relative to fluid flow through the filter media, or within a filter element, can generally be selected as desired. In some embodiments, first layer 110 is downstream of second layer 120 (e.g., in a filter element). In other embodiments, first layer 110 is upstream of second layer 120 (e.g., in a filter element).

Figure 1B:
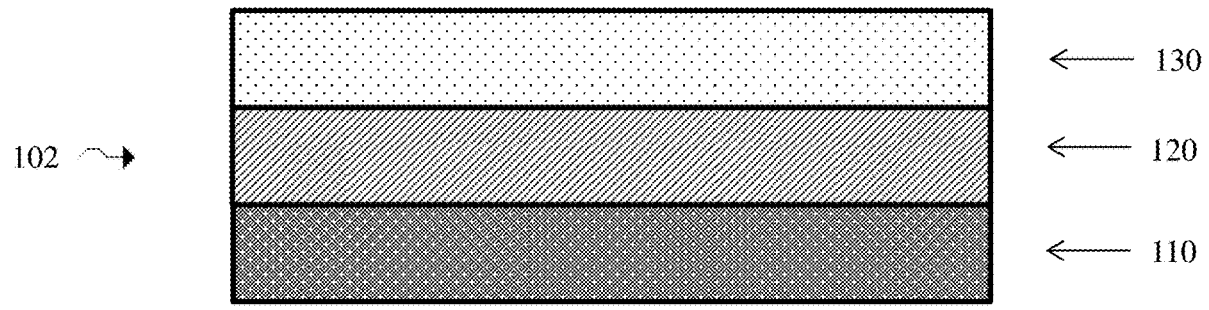
FIG. 1B shows a filter media including three layers according to some embodiments.

In some embodiments, the filter media may comprise at least three layers, as shown illustratively in FIG. 1B. A filter media 102 comprises a first layer 110, a second layer 120, and a third layer 130. In some embodiments, the third layer may be a support layer or a pre-filter layer. For example, in in one set of embodiments, the first layer may be a support layer and the third layer may be a pre-filter layer. In another set of embodiments, the first layer may be a pre-filter layer and the third layer may be a support layer. In some embodiments, an adhesive resin is present between the second layer and the third layer. The adhesive resin may serve to bond the second layer to the third layer. In some embodiments, the adhesive resin may be present in relatively small amounts between the second layer and the third layer but bonding between the second and third layers may be relatively strong (e.g., a bond strength of greater than or equal to 150 g/in$^2$).

In some cases, each of the layers of the filter media has different characteristics and filtration properties that, when combined, result in desirable overall filtration performance, for example, as compared to a filter media having a single-layered structure. For example, in one set of embodiments, third layer 130 is a pre-filter layer and second layer 120 is a main filter layer. In some embodiments, as described further below, the pre-filter layer may be formed using coarser fibers and, accordingly, may have a lower resistance to fluid flow than that of the main filter layer(s). The main filter layer(s) may include finer fibers and have a higher resistance to fluid flow than that of the pre-filter layer. As such, a main filter layer can generally trap particles of smaller size compared to the pre-filter layer.

As noted above, each of the layers of the filter media can have different properties. For instance, the first and second layers can include fibers having different characteristics (e.g., fiber diameters, fiber compositions, and fiber lengths). Fibers with different characteristics can be made from one material (e.g., by using different process conditions) or different materials (e.g., different types of fibers).

Figure 1C:
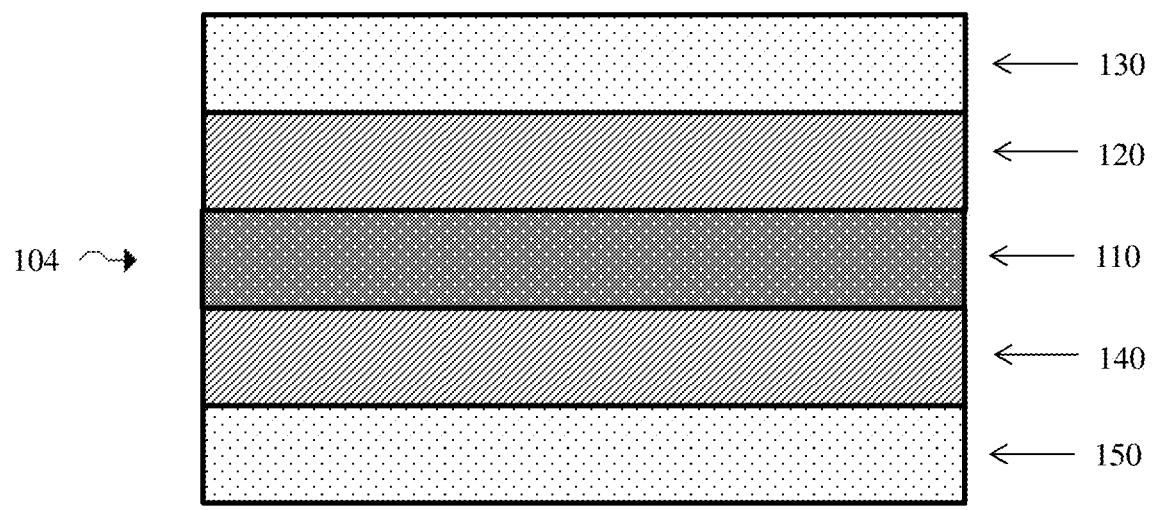
FIG. 1C shows a filter media including five layers according to some embodiments.

In some embodiments, the filter media may comprise more than one layer of the same type. For example, a filter may comprise two pre-filter layers, two support layers, and/or two main filter layers. FIG. 1C depicts one non-limiting example of an embodiment where the filter media comprises at least one pre-filter layer, at least one support layer, and two main filter layers. As shown therein, filter media 104 comprises first layer 110, second layer 120, third layer 130, fourth layer 140, and fifth layer 150. In some embodiments the third layer is a pre-filter layer, and both the second layer and the fourth layer are main filter layers. In some embodiments, one but not both of the third layer and the fifth layer is a support layer and the other is a pre-filter layer. For example, in one embodiment fifth layer 150 is a support layer that serves as a cover layer or protective layer, e.g., when the fifth layer is positioned downstream of the other layers in a filter element. The fifth layer may additionally serve as an efficiency layer in some instances. In some embodiments, both the third layer and the fifth layer are support layers. It should be understood that this figure is non-limiting, and that the filter media may comprise other numbers and types of layers, and that the layers may be positioned in a different order (e.g., two layers of the same type may be directly adjacent each other, each layer of the filter media may be different, the filter media may not have a symmetric configuration, and/or the filter media may comprise six, seven, or more layers).

As used herein, when a layer is referred to as being "on" or "adjacent" another layer, it can be directly on or adjacent the layer, or an intervening layer also may be present. A layer that is "directly on", "directly adjacent" or "in contact with" another layer means that no intervening layer is present.

Figure 2A:
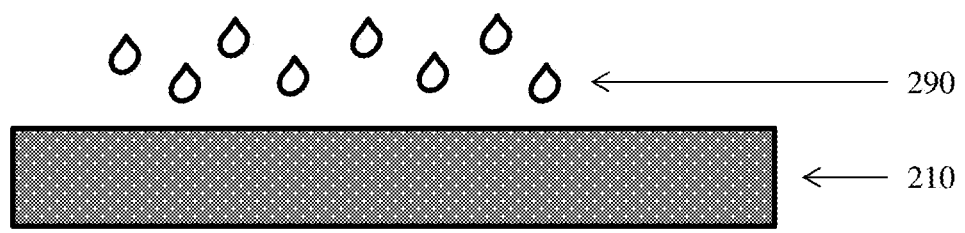
FIGS. 2A-2C show a method of forming a three-layered media according to some embodiments.
Figure 2B:
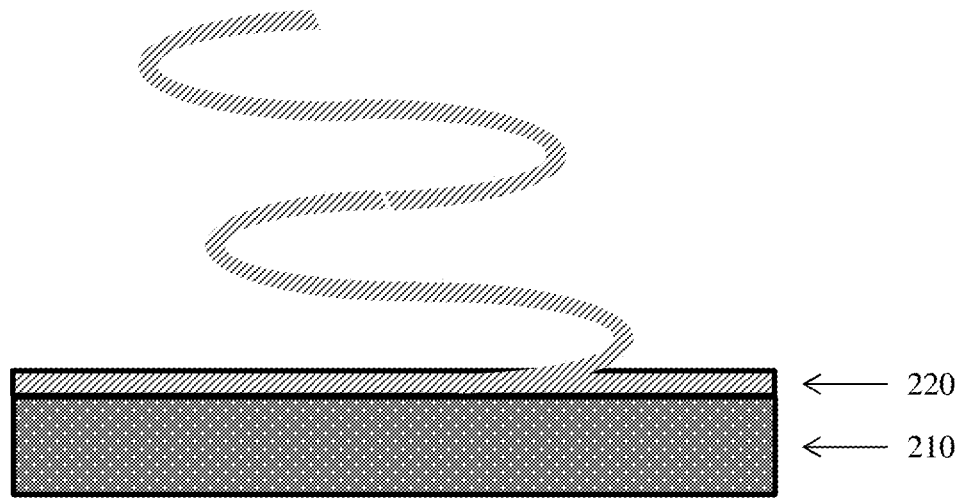
Figure 2C:
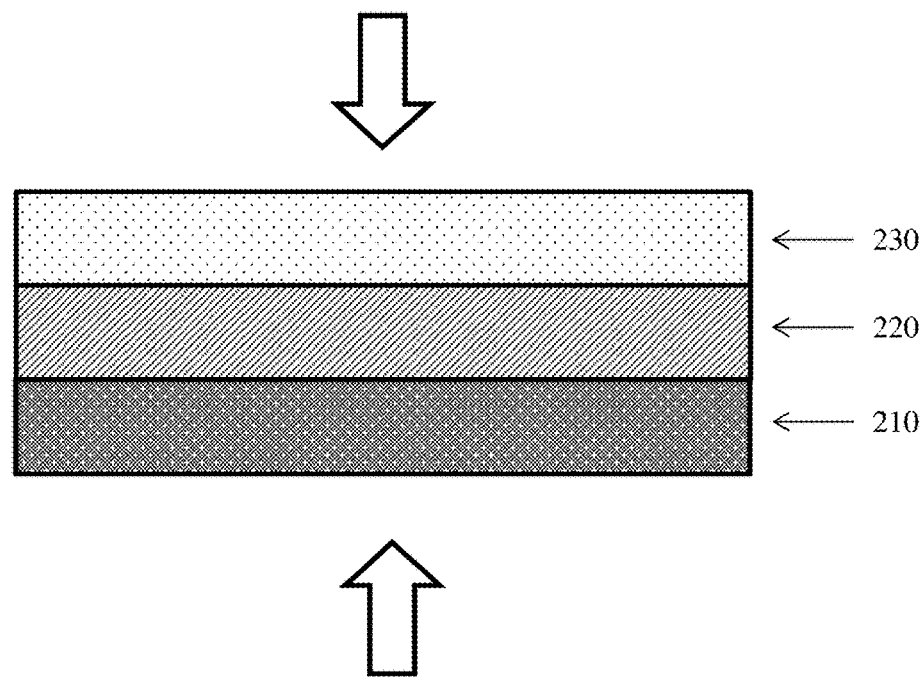

Certain embodiments relate to methods for fabricating filter media. An exemplary method for fabricating filter media is shown in FIGS. 2A-2C. In FIG. 2A, an adhesive 290 is deposited (e.g., sprayed) onto a first layer 210. The first layer may be a pre-filter layer or a support layer. In some embodiments, the adhesive may have a glass transition temperature of less than or equal to 25° C. and greater than or equal to −150° C. and/or may be a solvent-based resin, as described in further detail below. In some embodiments, the adhesive may comprise a solvent that is at least partially evaporated from the adhesive-based resin during or after the deposition of the adhesive onto the first layer. In some embodiments, the solvent may be water, or another solvent.

In some embodiments, the adhesive resin may undergo cross-linking after the deposition of the adhesive onto the first layer. Such processes may allow for an adhesive to be deposited using methods suitable for applying liquids (e.g., spraying) while also having favorable properties consistent with a solid (such as lack of flow under exposure to isopropyl alcohol vapor) after the deposition process is complete.

In some embodiments, spraying the adhesive may allow for a relatively low amount of adhesive to be deposited on the first layer in comparison to other methods for depositing adhesive. Spraying may comprise passing the adhesive through any suitable nozzle (e.g., an air atomizing nozzle, an ultrasonic nozzle, a piezoelectric nozzle, etc.). Other spraying parameters (e.g., the distance between the nozzle and the first layer, the air pressure applied to the adhesive during spraying, the size of the nozzle, etc.) can be selected as desired in order to control the amount of adhesive deposited on the first layer and other parameters.

After spraying the adhesive onto the first layer, a second layer 220 (e.g., a fine fiber layer) may be formed on layer 210 by performing a solvent-based spinning process, as shown illustratively in FIG. 2B. Non-limiting examples of solvent-spinning processes include an electrospinning process (e.g., solvent electrospinning) or a centrifugal spinning process. In some embodiments, the solvent-based spinning process may result in the formation of fibers with an average fiber diameter of less than 1 micron. In some embodiments, the second layer may be a main filter layer.

The use of a solvent-based resin may, in some embodiments, lower the conductivity of the substrate on which the resin is deposited (e.g., the first layer) and/or may aid in adhesion and/or uniform deposition of the second layer (e.g., by a solvent-spinning process).

In some embodiments, a third layer may be laminated onto the second layer. For instance, an adhesive may be deposited (e.g., sprayed) onto second layer 220, and then the second and third layers may be joined. The adhesive may increase the bond strength between the second layer and the third layer. Optionally, an adhesive may be deposited (e.g., sprayed) on the third layer prior to laminating the third layer to the second layer. The resulting media is shown illustratively in FIG. 2C, where third layer 230 is laminated and directly adjacent to second layer 220. In some embodiments, the third layer is a pre-filter layer or a support layer. For example, in some embodiments in which the first layer is pre-filter layer and the second layer is a main filter layer, the third layer may be a support layer. In embodiments in which the first layer is support layer and the second layer is a main filter layer, the third layer may be a pre-filter layer.

In some embodiments, the filter media may be subject to one or more treatment steps after two or more layers have been laminated together. For instance, the filter media may be subject to a step in which increased heat is applied, such as being passed through a felt dryer can, being passed through an air dryer, being passed through a calender roll, and/or being passed through a flat bed laminator. In some embodiments, the filter media may be subject to two or more such steps sequentially (e.g., the filter media may be passed through a felt dryer can and then passed through an air dryer). The increased heat may assist with the evaporation of any solvent remaining in the filter media prior to this step.

In some embodiments, applying heat to the filter media may comprise exposing the filter media to an environment (e.g., the inside of a dryer can, the inside of an air dryer, the inside of a calender roll, the inside of a flat bed laminator) where the temperature is greater than or equal to 40° C., greater than or equal to 60° C., greater than or equal to 80° C., or greater than or equal to 100° C. In some embodiments, applying heat to the filter media may comprise exposing the filter media to an environment (e.g., the inside of a dryer can, the inside of an air dryer, the inside of a calender roll, the inside of a flat bed laminator) where the temperature is less than or equal to 120° C., less than or equal to 100° C., less than or equal to 80° C., or less than or equal to 60° C. Combinations of the above-referenced ranges are also possible (e.g., greater than or equal to 40° C. and less than or equal to 120° C.). Other ranges are also possible.

In some embodiments, applying heat to the filter media may comprise passing the filter media through a heated environment (e.g., the inside of a dryer can, the inside of an air dryer, the inside of a calender roll, the inside of a flat bed laminator) at a rate of greater than or equal to 0.1 m/min, greater than or equal to 0.2 m/min, greater than or equal to 0.5 m/min, greater than or equal to 1 m/min, greater than or equal to 2 m/min, greater than or equal to 5 m/min, greater than or equal to 10 m/min, or greater than or equal to 20 m/min. In some embodiments, applying heat to the filter media may comprise passing the filter media through a heated environment (e.g., the inside of a dryer can, the inside of an air dryer, the inside of a calender roll, the inside of a flat bed laminator) at a rate of less than or equal to 40 m/min, less than or equal to 20 m/min, less than or equal to 10 m/min, less than or equal to 5 m/min, less than or equal to 2 m/min, less than or equal to 1 m/min, less than or equal to 0.5 m/min, or less than or equal to 0.2 m/min. Combinations of the above-referenced ranges are also possible (e.g., greater than or equal to 0.1 m/min and less than or equal to 40 m/min). Other ranges are also possible.

In some embodiments, one or more of the steps depicted in FIGS. 2A-2C may be repeated in the process of forming a filter media. For example, adhesive may be deposited (e.g., sprayed) onto both sides of the first layer and/or layers may be formed on each side of the first layer by a solvent-spinning processes such as an electrospinning process or a centrifugal spinning process. In some embodiments, layers may be laminated to both the top and the bottom of the filter media. It should be understood that these steps may occur sequentially (e.g., the steps depicted in FIGS. 2A-2C may be performed on one side of the first layer and then on the opposite side of the first layer) or simultaneously (e.g., the first layer may be coated with adhesive on both the top and bottom sides simultaneously, followed by the performance of the steps depicted in FIGS. 2B-2C on both sides of the first layer simultaneously). In some embodiments, five, nine, thirteen, or more layers of a filter media may be built up in this manner.

In embodiments for which one or more layers are added to the filter media, the processes for adding each layer may be an in-line processes or an off-line process. For example, in some embodiments, one or more of the layers (e.g., the first layer, the second layer, the third layer, the fourth layer, the fifth layer), may be added using a process in-line with respect to the system shown in FIG. 3. That is, the filter media may be fabricated on a production line and two or more of the processes described herein may occur on the same production line. Suitable processes that can be performed in-line include lamination, spraying an adhesive onto a layer, and gravure processes (e.g., hot melt gravure processes). In some embodiments, in-line may comprise fewer unwind and rewind processes compared to off-line processes.

As described above, in some embodiments, one or more of the layers may be a pre-filter layer. For example, in some embodiments, a first layer is a pre-filter layer. In some embodiments, a third layer is a pre-filter layer. In certain embodiments, both a third layer and a fifth layer are pre-filter layers. Properties of pre-filter layers will be described in further detail below.

References herein to a pre-filter layer or layers should be understood to refer to each pre-filter layer in the filter media independently (if any pre-filter layers are present at all). That is, each pre-filter layer that is present may independently have any or none of the properties described herein. In some embodiments, two or more pre-filter layers in the filter media may have similar compositions and/or properties. In other embodiments, each pre-filter layer in the filter media may have different compositions and/or properties.

In embodiments where the filter media comprises at least one pre-filter layer (e.g., a first layer, a third layer), the fibers in the pre-filter layer or layers may have any suitable average diameter. In some embodiments, the average diameter of the fibers in the pre-filter layer or layers (e.g., a first layer, a third layer, a fifth layer) is greater than or equal to 0.1 microns, greater than or equal to 0.2 microns, greater than or equal to 0.5 microns, greater than or equal to 1 micron, greater than or equal to 2 microns, greater than or equal to 5 microns, greater than or equal to 10 microns, greater than or equal to 20 microns, greater than or equal to 40 microns, or greater than or equal to 60 microns. In some embodiments, the average diameter of the fibers in the pre-filter layer or layers (e.g., a first layer, a third layer, a fifth layer) is less than or equal to 75 microns, less than or equal to 60 microns, less than or equal to 40 microns, less than or equal to 20 microns, less than or equal to 10 microns, less than or equal to 5 microns, less than or equal to 2 microns, less than or equal to 1 micron, less than or equal to 0.5 microns, or less than or equal to 0.2 microns. Combinations of the above-referenced ranges are also possible (e.g., greater than or equal to 0.1 micron and less than or equal to 75 microns, greater than or equal to 0.5 microns and less than or equal to 75 microns, greater than or equal to 0.5 microns and less than or equal to 40 microns, or greater than or equal to 0.5 microns and less than or equal to 2 microns). Other ranges are also possible.

In some embodiments where the filter media comprises at least one pre-filter layer (e.g., a first layer, a third layer, a fifth layer), the pre-filter layer may comprise continuous fibers. The continuous fibers may have any suitable average length. In some embodiments, the average length of the continuous fibers in the pre-filter layer or layers (e.g., a first layer, a third layer, a fifth layer) may be greater than or equal to 1 inch, greater than or equal to 2 inches, greater than or equal to 5 inches, greater than or equal to 10 inches, greater than or equal to 20 inches, greater than or equal to 50 inches, greater than or equal to 100 inches, greater than or equal to 200 inches, or greater than or equal to 500 inches. In some embodiments, the average length of the continuous fibers in the pre-filter layer or layers (e.g., a first layer, a third layer, a fifth layer) may be less than or equal to 1000 inches, less than or equal to 500 inches, less than or equal to 200 inches, less than or equal to 100 inches, less than or equal to 50 inches, less than or equal to 20 inches, less than or equal to 10 inches, or less than or equal to 5 inches. Combinations of the above-referenced properties are also possible (e.g., greater than or equal to 5 inches and less than or equal to 1000 inches). Other ranges are also possible.

In other embodiments where the filter media comprises at least one pre-filter layer (e.g., a first layer, a third layer, a fifth layer), the pre-filter layer may comprise staple fibers. The staple fibers may have any suitable average length. In some embodiments, the average length of the staple fibers in the pre-filter layer or layers (e.g., a first layer, a third layer, a fifth layer) may be greater than or equal to 0.3 mm, greater than or equal to 0.5 mm, greater than or equal to 1 mm, greater than or equal to 2 mm, greater than or equal to 5 mm, greater than or equal to 10 mm, greater than or equal to 20 mm, or greater than or equal to 50 mm. In some embodiments, the average length of the staple fibers in the pre-filter layer or layers (e.g., a first layer, a third layer, a fifth layer) may be less than or equal to 100 mm, less than or equal to 50 mm, less than or equal to 20 mm, less than or equal to 10 mm, less than or equal to 5 mm, less than or equal to 2 mm, less than or equal to 1 mm, or less than or equal to 0.5 mm. Combinations of the above-referenced ranges are also possible (e.g., greater than or equal to 0.3 mm and less than or equal to 100 mm, or greater than or equal to 1 mm and less than or equal to 50 mm). Other ranges are also possible.

In some embodiments of filter media that comprises at least one pre-filter layer (e.g., a first layer, a third layer, a fifth layer), the pre-filter layer or layers may comprise synthetic fibers, glass fibers, and/or cellulose fibers, amongst other fiber types. In some instances, the pre-filter layer or layers (e.g., a first layer, a third layer, a fifth layer) may comprise a relatively high weight percentage of synthetic fibers (e.g., 100 weight percent). For example, the pre-filter layer or layers may (e.g., a first layer, a third layer, a fifth layer) comprise synthetic fibers formed from a meltblown process, melt spinning process, centrifugal spinning process, electrospinning, wet laid, dry laid, or air laid process. In some instances, the synthetic fibers may be continuous, as described further below. In some embodiments, the pre-filter layer or layers (e.g., a first layer, a third layer, a fifth layer) may comprise relatively little or no glass fibers. In other embodiments, the pre-filter layer or layers (e.g., a first layer, a third layer, a fifth layer) may comprise a relatively high weight percentage of glass fibers (e.g., 100 weight percent).

In some embodiments, the filter media may comprise at least one pre-filter layer (e.g., a first layer, a third layer, a fifth layer) and at least one of the pre-filter layers present may comprise synthetic fibers. The synthetic fibers may have a relatively small average fiber diameter (e.g., less than or equal to about 2 microns). For instance, the synthetic fibers in a pre-filter layer or layers (e.g., a first layer, a third layer, a fifth layer) may have an average diameter of less than or equal to about 2 microns (e.g., between about 0.5 microns and about 1.0 micron). In some embodiments, the synthetic fibers in a pre-filter layer or layers (e.g., a first layer, a third layer, a fifth layer) may be continuous fibers formed by any suitable process (e.g., a melt-blown, a meltspun, an electrospinning (e.g., melt electrospinning, solvent electrospinning), centrifugal spinning, wet laid, dry laid, or air laid process. In certain embodiments, the synthetic fibers may be formed by an electrospinning process. In other embodiments, the synthetic fibers may be non-continuous. In some embodiments, all of the fibers in a pre-filter layer or layers (e.g., a first layer, a third layer, a fifth layer) are synthetic fibers.

The synthetic fibers may include any suitable type of synthetic polymer. Examples of suitable synthetic fibers include polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such as lyocell, rayon), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multi-component fibers (i.e., fibers having multiple compositions such as bicomponent fibers). In some cases, synthetic fibers may include meltblown, meltspun, electrospun (e.g., melt, solvent), or centrifugal spun fibers, which may be formed of polymers described herein (e.g., polyester, polypropylene). In some embodiments, synthetic fibers may be electrospun fibers. The pre-filter layer or layers (e.g., a first layer, a third layer, a fifth layer), when present, may also include combinations of more than one type of synthetic fiber. It should be understood that other types of synthetic fiber types may also be used.

In some embodiments, the average diameter of the synthetic fibers of one or more pre-filter layers (if present, e.g., a first layer, a third layer, a fifth layer) may be, for example, greater than or equal to about 0.1 microns, greater than or equal to about 0.3 microns, greater than or equal to about 0.5 microns, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 20 microns. In some instances, the synthetic fibers may have an average diameter of less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, less than or equal to about 1.5 microns, less than or equal to about 1 micron, less than or equal to about 0.8 microns, or less than or equal to about 0.5 microns. Combinations of the above-referenced ranges are also possible (e.g., greater than or equal to about 1 micron and less than or equal to about 5 microns). Other values of average fiber diameter are also possible. The average diameter of a fiber can be determined, for example, by scanning electron microscopy.

In some cases, the synthetic fibers (if present) may be continuous (e.g., meltblown fibers, spunbond fibers, electrospun fibers, centrifugal spun fibers, etc.). Lengths of continuous fibers are provided above. In other embodiments, the synthetic fibers (if present) are not continuous (e.g., staple fibers). Lengths of staple fibers are provided above. Continuous fibers are made by a "continuous" fiber-forming process, such as a meltblown process, a spunbond process, an electrospinning process, or a centrifugal spinning process, and typically have longer lengths than non-continuous fibers. Non-continuous fibers are staple fibers that are generally cut (e.g., from a filament) or formed as non-continuous discrete fibers to have a particular length or a range of lengths.

In embodiments where the filter media comprises at least one pre-filter layer (e.g., a first layer, a third layer, a fifth layer) comprising synthetic fibers, the synthetic fibers may make up any suitable portion of that layer. In some embodiments, the wt % of synthetic fibers in the pre-filter layer (e.g., a first layer, a third layer, a fifth layer) may be greater than or equal to 0 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %. In some embodiments, the wt % of synthetic fibers in the pre-filter layer (e.g., a first layer, a third layer, a fifth layer) may be less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt %. Combinations of the above-referenced ranges are also possible (e.g., greater than or equal to 0 wt % and less than or equal to 100 wt %, or greater than or equal to 10 wt % and less than or equal to 100 wt %). Other ranges are also possible. In some embodiments, the wt % of synthetic fibers in the pre-filter layer (e.g., a first layer, a third layer, a fifth layer) may be 100 wt %.

In some embodiments, the filter media may comprise at least one pre-filter layer (e.g., a first layer, a third layer, a fifth layer) and at least one of the pre-filter layers present may comprise bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers.

In some embodiments, bicomponent fibers (if present) may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In embodiments where the filter media comprises at least one pre-filter layer (e.g., a first layer, a third layer, a fifth layer) comprising bicomponent fibers, the bicomponent fibers may make up any suitable portion of that layer. In some embodiments, the wt % of bicomponent fibers in the pre-filter layer or layers may be greater than or equal to 0 wt %, greater than or equal to 2.5 wt %, greater than or equal to 5 wt %, greater than or equal to 7.5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt %. In some embodiments, the wt % of bicomponent fibers in the pre-filter layer or layers may be less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, or less than or equal to 2.5 wt %. Combinations of the above-referenced ranges are also possible (e.g., greater than or equal to 0 wt % and less than or equal to 50 wt %, or greater than or equal to 0 wt % and less than or equal to 10 wt %). Other ranges are also possible.

In some embodiments, the filter media may comprise at least one pre-filter layer (e.g., a first layer, a third layer, a fifth layer) and at least one of the pre-filter layers present may comprise one or more cellulose fibers, such as softwood fibers, hardwood fibers, a mixture of hardwood and softwood fibers, regenerated cellulose fibers, and/or mechanical pulp fibers (e.g., groundwood, chemically treated mechanical pulps, and thermomechanical pulps).

The average diameter of the cellulose fibers in one or more pre-filter layers (i.e., in embodiments comprising at least one pre-filter, e.g., a first layer, a third layer, a fifth layer) may be, for example, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the cellulose fibers may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, or less than or equal to about 2 microns. Combinations of the above-referenced ranges are also possible (e.g., greater than or equal to about 1 micron and less than or equal to about 5 microns). Other values of average fiber diameter are also possible.

In some embodiments, the cellulose fibers (if present) may have an average length. For instance, in some embodiments, cellulose fibers may have an average length of greater than or equal to about 0.5 mm, greater than or equal to about 1 mm, greater than or equal to about 2 mm, greater than or equal to about 3 mm, greater than or equal to about 4 mm, greater than or equal to about 5 mm, greater than or equal to about 6 mm, or greater than or equal to about 8 mm. In some instances, cellulose fibers may have an average length of less than or equal to about 10 mm, less than or equal to about 8 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

In embodiments where the filter media comprises at least one pre-filter layer (e.g., a first layer, a third layer, a fifth layer) comprising cellulose fibers, the cellulose fibers may make up any suitable portion of that layer. In some embodiments, the wt % of cellulose fibers in the pre-filter layer or layers (e.g., a first layer, a third layer, a fifth layer) may be greater than or equal to 0 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %. In some embodiments, the wt % of cellulose fibers in the pre-filter layer or layers (e.g., a first layer, a third layer, a fifth layer) may be less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt %. Combinations of the above-referenced ranges are also possible (e.g., greater than or equal to 0 wt % and less than or equal to 100 wt %, or greater than or equal to 0 wt % and less than or equal to 80 wt %). Other ranges are also possible. In some embodiments, the wt % of cellulose fibers in the pre-filter layer (e.g., a first layer, a third layer, a fifth layer) may be 100 wt %.

In some embodiments, the filter media may comprise one or more pre-filter layers (e.g., a first layer, a third layer, a fifth layer), and at least one pre-filter layer may include fibrillated fibers. As known to those of ordinary skill in the art, a fibrillated fiber includes a parent fiber that branches into smaller diameter fibrils, which can, in some instances, branch further out into even smaller diameter fibrils with further branching also being possible. The branched nature of the fibrils leads to a layer and/or fiber web having a high surface area and can increase the number of contact points between the fibrillated fibers and other fibers in the web. Such an increase in points of contact between the fibrillated fibers and other fibers and/or components of the web may contribute to enhancing mechanical properties (e.g., flexibility, strength) and/or filtration performance properties of the layer and/or fiber web.

In some embodiments the parent fibers (if present) may have an average diameter in the micron or sub-micron range. For example, the parent fibers may have an average diameter of greater than or equal to about 0.5 microns, greater than or equal to about 1 micron, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, or greater than or equal to about 70 microns. In some embodiments, the parent fibers may have an average diameter of less than or equal to about 75 microns, less than or equal to about 55 microns, less than or equal to about 35 microns, less than or equal to about 25 microns, less than or equal to about 15 microns, less than or equal to about 10 microns, less than or equal to about 5 microns, less than or equal to about 2 microns, or less than or equal to about 0.5 microns. Combinations of the above referenced ranges are also possible (e.g., parent fibers having an average diameter of greater than or equal to about 1 micron and less than or equal to about 25 microns). Other ranges are also possible.

The average diameter of the fibrils (if present) is generally less than the average diameter of the parent fibers. Depending on the average diameter of the parent fibers, in some embodiments, the fibrils may have an average diameter of less than or equal to about 25 microns, less than or equal to about 20 microns, less than or equal to about 10 microns, less than or equal to about 5 microns, less than or equal to about 1 micron, less than or equal to about 0.5 microns, less than or equal to about 0.1 microns, less than or equal to about 0.05 microns, or less than or equal to about 0.01 microns. In some embodiments the fibrils may have an average diameter of greater than or equal to about 0.003 microns, greater than or equal to about 0.01 micron, greater than or equal to about 0.05 microns, greater than or equal to about 0.1 microns, greater than or equal to about 0.5 microns greater than or equal to about 1 micron, greater than or equal to about 5 microns, greater than or equal to about 10 microns, or greater than or equal to about 20 microns. Combinations of the above referenced ranges are also possible (e.g., fibrils having an average diameter of greater than or equal to about 0.01 microns and less than or equal to about 20 microns). Other ranges are also possible.

In some embodiments, the average length of the fibrillated fibers (if present) may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of the fibrillated fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., fibrillated fibers having an average length of greater than or equal to about 4 mm and less than about 6 mm). Other ranges are also possible. The average length of the fibrillated fibers refers to the average length of parent fibers from one end to an opposite end of the parent fibers. In some embodiments, the maximum average length of the fibrillated fibers falls within the above-noted ranges. The maximum average length refers to the average of the maximum dimension along one axis of the fibrillated fibers (including parent fibers and fibrils). It should be understood that, in certain embodiments, the fibers and fibrils may have dimensions outside the above-noted ranges.

The level of fibrillation of the fibrillated fibers (if present) may be measured according to any number of suitable methods. For example, the level of fibrillation can be measured according to a Canadian Standard Freeness (CSF) test, specified by TAPPI test method T 227 om 09 Freeness of pulp. The test can provide an average CSF value. In some embodiments, the average CSF value of the fibrillated fibers may vary between about 10 mL and about 750 mL. In certain embodiments, the average CSF value of the fibrillated fibers used in the pre-filter layer or layers may be greater than or equal to about 10 mL, greater than or equal to about 50 mL, greater than or equal to about 100 mL, greater than or equal to about 200 mL, greater than or equal to about 400 mL, greater than or equal to about 600 mL, or greater than or equal to about 700 mL. In some embodiments, the average CSF value of the fibrillated fibers may be less than or equal to about 800 mL, less than or equal to about 600 mL, less than or equal to about 400 mL, less than or equal to about 200 mL, less than or equal to about 100 mL, or less than or equal to about 50 mL. Combinations of the above-referenced ranges are also possible (e.g., an average CSF value of fibrillated fibers of greater than or equal to about 10 mL and less than or equal to about 300 mL). Other ranges are also possible. The average CSF value of the fibrillated fibers may be based on one type of fibrillated fiber or more than one type of fibrillated fiber.

In embodiments where the filter media comprises at least one pre-filter layer (e.g., a first layer, a third layer, a fifth layer) comprising fibrillated fibers, the fibrillated fibers may make up any suitable portion of that layer. In some embodiments, the wt % of fibrillated fibers in the pre-filter layer or layers (e.g., a first layer, a third layer, a fifth layer) may be greater than or equal to 0 wt %, greater than or equal to 10 wt %, greater than or equal to 25 wt %, greater than or equal to 50 wt %, greater than or equal to 75 wt %, or greater than or equal to 90 wt %. In some embodiments, the wt % of fibrillated fibers in the pre-filter layer or layers (e.g., a first layer, a third layer, a fifth layer) may be less than or equal to 100 wt %, less than or equal to 90 wt %, less than or equal to 75 wt %, less than or equal to 50 wt %, less than or equal to 25 wt %, or less than or equal to 10 wt %. Combinations of the above-referenced ranges are also possible (e.g., greater than or equal to 0 wt % and less than or equal to 100 wt %, or greater than or equal to 0 wt % and less than or equal to 75 wt %). Other ranges are also possible. In some embodiments, the wt % of fibrillated fibers in the pre-filter layer (e.g., a first layer, a third layer, a fifth layer) may be 100 wt %.

In some embodiments, the filter media may comprise at least one pre-filter layer (e.g., a first layer, a third layer, a fifth layer) that includes glass fibers (e.g., microglass fibers, chopped strand glass fibers, or a combination thereof).

The average diameter of glass fibers (if present) may be, for example, less than or equal to about 30 microns, less than or equal to about 25 microns, less than or equal to about 15 microns, less than or equal to about 12 microns, less than or equal to about 10 microns, less than or equal to about 9 microns, less than or equal to about 7 microns, less than or equal to about 5 microns, less than or equal to about 3 microns, or less than or equal to about 1 micron. In some instances, the glass fibers may have an average fiber diameter of greater than or equal to about 0.1 microns, greater than or equal to about 0.3 microns, greater than or equal to about 1 micron, greater than or equal to about 3 microns, or greater than equal to about 7 microns greater than or equal to about 9 microns, greater than or equal to about 11 microns, or greater than or equal to about 20 microns. Combinations of the above-referenced ranges are also possible (e.g., greater than or equal to about 0.1 microns and less than or equal to about 9 microns). Other values of average fiber diameter are also possible.

In some embodiments, the average length of microglass fibers (if present) may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than about 6 mm). Other ranges are also possible.

In general, chopped strand glass fibers (if present) may have an average fiber diameter that is greater than the diameter of the microglass fibers. In some embodiments, chopped strand glass fibers may have a length in the range of between about 0.125 inches and about 1 inch (e.g., about 0.25 inches, or about 0.5 inches). In some embodiments, the average length of chopped strand glass fibers may be less than or equal to about 1 inch, less than or equal to about 0.8 inches, less than or equal to about 0.6 inches, less than or equal to about 0.5 inches, less than or equal to about 0.4 inches, less than or equal to about 0.3 inches, or less than or equal to about 0.2 inches. In certain embodiments, the average length of chopped strand glass fibers may be greater than or equal to about 0.125 inches, greater than or equal to about 0.2 inches, greater than or equal to about 0.4 inches, greater than or equal to about 0.5 inches, greater than equal to about 0.6 inches, or greater than or equal to about 0.8 inches. Combinations of the above referenced ranges are also possible (e.g., chopped strand glass fibers having an average length of greater than or equal to about 0.125 inches and less than about 1 inch). Other ranges are also possible.

In some embodiments, the filter media may comprise at least one pre-filter layer (e.g., a first layer, a third layer, a fifth layer), and that layer may comprise glass fibers in any suitable amount. In some embodiments, the wt % of fibers in the pre-filter layer or layers (e.g., a first layer, a third layer, a fifth layer) may be greater than or equal to 0 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, or greater than or equal to 95 wt %. In some embodiments, the wt % of fibers in the pre-filter layer or layers (e.g., a first layer, a third layer, a fifth layer) may be less than or equal to 100 wt %, less than or equal to 95 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt %. Combinations of the above-referenced ranges are also possible (e.g., greater than or equal to 0 wt % and less than or equal to 100 wt %, or greater than or equal to 0 wt % and less than or equal to 95 wt %). Other ranges are also possible. In some embodiments, the wt % of glass fibers in the pre-filter layer (e.g., a first layer, a third layer, a fifth layer) may be 100 wt %.

In some embodiments, the filter media may comprise at least one pre-filter layer (e.g., a first layer, a third layer, a fifth layer), and the pre-filter layer or layers may comprise one or more additives. In some embodiments, the additive may comprise a wax, such as acrawax. In some embodiments, the wt % of wax in the pre-filter layer or layers may be greater than or equal to 0 wt %, greater than or equal to 0.1 wt %, greater than or equal to 0.2 wt %, greater than or equal to 0.5 wt %, greater than or equal to 1 wt %, or greater than or equal to 2 wt %. In some embodiments, the wt % of wax in the pre-filter layer or layers (e.g., a first layer, a third layer, a fifth layer) may be less than or equal to 4 wt %, less than or equal to 2 wt %, less than or equal to 1 wt %, less than or equal to 0.5 wt %, less than or equal to 0.2 wt %, or less than or equal to 0.1 wt %. Combinations of the above-ranges are also possible (e.g., greater than or equal to 0 wt % and less than or equal to 10 wt %, or greater than or equal to 0.5 t % and less than or equal to 4 wt %). Other ranges are also possible.

In some embodiments, the additive (if present) may include a stearate salt (e.g., magnesium stearate, calcium stearate). In some embodiments, the wt % of magnesium stearate in the pre-filter (e.g., a first layer, a third layer, a fifth layer) may be greater than or equal to 0 wt %, greater than or equal to 0.1 wt %, greater than or equal to 0.2 wt %, greater than or equal to 0.5 wt %, greater than or equal to 1 wt %, or greater than or equal to 2 wt %. In some embodiments, the wt % of magnesium stearate in the pre-filter layer or layers (e.g., a first layer, a third layer, a fifth layer) may be less than or equal to 4 wt %, less than or equal to 2 wt %, less than or equal to 1 wt %, less than or equal to 0.5 wt %, less than or equal to 0.2 wt %, or less than or equal to 0.1 wt %. Combinations of the above-ranges are also possible (e.g., greater than or equal to 0 wt % and less than or equal to 10 wt %, or greater than or equal to 0.5 wt % and less than or equal to 4 wt %). Other ranges are also possible.

In embodiments where the filter media comprises at least one pre-filter layer (e.g., a first layer, a third layer, a fifth layer), the pre-filter layer or layers may have any suitable basis weight. In some embodiments, the pre-filter layer or layers (e.g., a first layer, a third layer, a fifth layer) may have a basis weight of greater than or equal to 0.2 g/m$^2$, greater than or equal to 0.5 g/m$^2$, greater than or equal to 1 g/m$^2$, greater than or equal to 2 g/m$^2$, greater than or equal to 3 g/m$^2$, greater than or equal to 5 g/m$^2$, greater than or equal to 10 g/m$^2$, greater than or equal to 20 g/m$^2$, greater than or equal to 40 g/m$^2$, or greater than or equal to 100 g/m$^2$. In some embodiments, the pre-filter layer or layers (e.g., a first layer, a third layer, a fifth layer) may have a basis weight of less than or equal to 150 g/m$^2$, less than or equal to 100 g/m$^2$, less than or equal to 40 g/m$^2$, less than or equal to 20 g/m$^2$, less than or equal to 10 g/m$^2$, less than or equal to 5 g/m$^2$, less than or equal to 2 g/m$^2$, less than or equal to 1 g/m$^2$, or less than or equal to 0.5 g/m$^2$. Combinations of the above-referenced ranges are also possible (e.g., greater than or equal to 0.2 g/m$^2$ and less than or equal to 150 g/m$^2$, greater than or equal to 0.5 g/m$^2$ and less than or equal to 40 g/m$^2$, or greater than or equal to 3 g/m$^2$ and less than or equal to 40 g/m$^2$). Other ranges are also possible. The basis weight may be determined according to the standard ISO 536.

In some embodiments where the filter media comprises at least one pre-filter layer (e.g., a first layer, a third layer, a fifth layer), the pre-filter layer or layers may have a thickness of greater than or equal to 0.02 mm, greater than or equal to 0.05 mm, greater than or equal to 0.1 mm, greater than or equal to 0.2 mm, greater than or equal to 0.5 mm, greater than or equal to 1 mm, or greater than or equal to 2 mm. In some embodiments, the pre-filter layer or layers (e.g., a first layer, a third layer, a fifth layer) may have a thickness of less than or equal to 5 mm, less than or equal to 2 mm, less than or equal to 1 mm, less than or equal to 0.5 mm, less than or equal to 0.2 mm, less than or equal to 0.1 mm, or less than or equal to 0.05 mm. Combinations of the above-referenced ranges are also possible (e.g., greater than or equal to 0.02 mm and less than or equal to 5 mm, or greater than or equal to 0.1 mm and less than or equal to 1 mm). Other ranges are also possible. The thickness of the pre-filter layer or layers may be determined according to the standard ISO 534 at 50 kPa.

In some embodiments where the filter media comprises at least one pre-filter layer (e.g., a first layer, a third layer, a fifth layer), the pre-filter layer or layers may have a mean flow pore size of greater than or equal to 0.5 microns, greater than or equal to 1 micron, greater than or equal to 2 microns, greater than or equal to 4 microns, greater than or equal to 10 microns, greater than or equal to 20 microns, greater than or equal to 50 microns, or greater than or equal to 70 microns. In some embodiments, the pre-filter layer or layers (e.g., a first layer, a third layer, a fifth layer) may have a mean flow pore size of less than or equal to 100 microns, less than or equal to 70 microns, less than or equal to 50 microns, less than or equal to 20 microns, less than or equal to 10 microns, less than or equal to 4 microns, less than or equal to 2 microns, or less than or equal to 1 micron. Combinations of the above-referenced ranges are also possible (e.g., greater than or equal to 0.5 microns and less than or equal to 100 microns, greater than or equal to 1 micron and less than or equal to 70 microns, or greater than or equal to 0.5 microns and less than or equal to 4 microns). Other ranges are also possible. The mean flow pore size may be determined according to the standard ASTM F316-03.

In some embodiments, the filter media may comprise one or more pre-filter layers (e.g., a first layer, a third layer, a fifth layer), and the pressure drop across the pre-filter layer or layers may be greater than or equal to 0.1 mm H$_2$O, greater than or equal to 0.2 mm H$_2$O, greater than or equal to 0.6 mm H$_2$O, greater than or equal to 1 mm H$_2$O, greater than or equal to 2 mm H$_2$O, greater than or equal to 5 mm H$_2$O, greater than or equal to 10 mm H$_2$O, or greater than or equal to 25 mm H$_2$O. In some embodiments, the pressure drop across the pre-filter layer or layers (e.g., a first layer, a third layer, a fifth layer) may be less than or equal to 50 mm $H_2O$, less than or equal to 25 mm $H_2O$, less than or equal to 10 mm $H_2O$, less than or equal to 5 mm $H_2O$, less than or equal to 2 mm $H_2O$, less than or equal to 1 mm $H_2O$, less than or equal to 0.6 mm $H_2O$, or less than or equal to 0.2 mm $H_2O$. Combinations of the above-referenced ranges are also possible (e.g., greater than or equal to 0.1 mm $H_2O$ and less than or equal to 50 mm $H_2O$, or greater than or equal to 0.6 mm $H_2O$ and less than or equal to 25 mm $H_2O$). Other ranges are also possible. The pressure drop may be determined using ASTM D2 986-91.

In some embodiments, the filter media may comprise one or more pre-filter layers, and the air permeability of the pre-filter layer or layers (e.g., a first layer, a third layer, a fifth layer) may be greater than or equal to 2 $ft^3/min/ft^2$ (CFM), greater than or equal to 4 CFM, greater than or equal to 8 CFM, greater than or equal to 10 CFM, greater than or equal to 20 CFM, greater than or equal to 50 CFM, greater than or equal to 100 CFM, greater than or equal to 300 CFM, greater than or equal to 500 CFM, or greater than or equal to 1000 CFM. In some embodiments, the air permeability of the pre-filter layer or layers (e.g., a first layer, a third layer, a fifth layer) may be less than or equal to 1400 CFM, less than or equal to 1000 CFM, less than or equal to 500 CFM, less than or equal to 300 CFM, less than or equal to 300 CFM, less than or equal to 100 CFM, less than or equal to 50 CFM, less than or equal to 20 CFM, less than or equal to 10 CFM, less than or equal to 8 CFM, or less than or equal to 4 CFM. Combinations of the above-referenced ranges are also possible (e.g., greater than or equal to 2 CFM and less than or equal to 1400 CFM, or greater than or equal to 8 CFM and less than or equal to 300 CFM). Other ranges are also possible. The air permeability may be determined using TAPPI Method T251.

In some embodiments, the filter media may comprise one or more pre-filter layers, and the solidity of the pre-filter layer or layers (e.g., a first layer, a third layer, a fifth layer) may be greater than or equal to 0.001, greater than or equal to 0.0025, greater than or equal to 0.005, greater than or equal to 0.01, greater than or equal to 0.025, greater than or equal to 0.05, greater than or equal to 0.1, greater than or equal to 0.25, greater than or equal to 0.5, greater than or equal to 1, greater than or equal to 2.5, greater than or equal to 5, greater than or equal to 10, or greater than or equal to 25. In some embodiments, the solidity of the pre-filter layer or layers (e.g., a first layer, a third layer, a fifth layer) may be less than or equal to 50, less than or equal to 25, less than or equal to 10, less than or equal to 5, less than or equal to 2.5, less than or equal to 1, less than or equal to 0.5, less than or equal to 0.25, less than or equal to 0.1, less than or equal to 0.05, less than or equal to 0.025, less than or equal to 0.01, less than or equal to 0.005, or less than or equal to 0.0025. Combinations of the above-referenced ranges are also possible (e.g., greater than or equal to 0.001 and less than or equal to 50, or greater than or equal to 0.01 and less than or equal to 25). Other ranges are also possible. Solidity may be determined by using the following formula: solidity=[basis weight/(fiber density*thickness)]*100. The basis weight and thickness may be determined as described herein. The porosity can be derived from the solidity based on the following equation: solidity (%)=100−porosity (%). The fiber density is equivalent to the average density of the material or material(s) forming the fiber, which is typically specified by the fiber manufacturer. The average density is found by dividing the total mass of fibers within the filter by the total volume of fibers within the prefilter, wherein the total volume of fibers within the prefilter is the sum of the ratio of the mass of each fiber type to the density of each fiber type.

In some embodiments, the filter media may comprise one or more pre-filter layers, and the dioctyl phthalate (DOP) particle efficiency of the pre-filter layer or layers (e.g., a first layer, a third layer, a fifth layer) may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 97%, greater than or equal to 99%, or greater than or equal to 99.5% In some embodiments, the DOP particle efficiency of the pre-filter layer or layers (e.g., a first layer, a third layer, a fifth layer) may be less than or equal to 99.5%, less than or equal to 99%, less than or equal to 97%, less than or equal to 95%, less than or equal to 90%, less than or equal to 85%, less than or equal to 80%, less than or equal to 70%, less than or equal to 60%, less than or equal to 50%, less than or equal to 40%, or less than or equal to 30%. Combinations of the above-referenced ranges are also possible (e.g., greater than or equal to 20% and less than or equal to 80%). Other ranges are also possible. The DOP particle efficiency may be measured by blowing DOP particles through the pre-filter layer or layers (e.g., a first layer, a third layer, a fifth layer) and measuring the percentage of particles that penetrate through the layer(s). This percentage may be determined using a TSI 3160 automated filter testing unit from TSI, Inc. equipped with a DOP generator for DOP aerosol testing based on the EN1822:2009 standard for most penetrating particle size (MPPS) DOP particles and using particles with average diameters varying from 0.02 microns to 0.3 microns generated by the particle generator. The penetration is measured under continuous loading of DOP particles at a face velocity of 2.0 cm/second.

In some embodiments, the pre-filter (e.g., a first layer, a third layer, a fifth layer) is charged. Charge may be induced on the pre-filter by a charging process (e.g., an electrostatic charging process, a triboelectric charging process, or a hydro charging process). In other embodiments, the pre-filter (e.g., a first layer, a third layer, a fifth layer) is uncharged.

In some embodiments, the prefilter layer (e.g., first layer, third layer, fifth layer) is flame retardant or comprises one or more flame retardant components. For instance, the pre-filter layer may comprise flame retardant fibers, a flame retardant binder, a flame retardant coating, and/or flame retardant additives (e.g., flame retardant particles, flame retardant flakes). The flame retardant component(s) may be introduced during fabrication (e.g., during a melt-blown process, a meltspun process, an electrospinning process, a centrifugal spinning process, a wet laid process, a dry laid process, or an air laid process), or may be added to a binder.

As described above, in some embodiments, one or more of the layers of a filter media may be a main filter layer. For example, in some embodiments, a second layer may be a pre-filter layer. In other embodiments, both a second layer and a fourth layer are main filter layers. The main filter layer may, for example, have a higher efficiency than one or more other layer(s) of the media. Properties of main filter layers will be described in further detail herein.

References herein to a main filter layer or layers should be understood to refer to each main filter layer in the filter media independently (if any main filter layers are present at all). That is, each main filter layer that is present may independently have any or none of the properties described below. In some embodiments, two or more main filter layers in the filter media may have similar compositions and/or properties. In other embodiments, each main filter layer in the filter media may have different compositions and/or properties.

In some embodiments that comprise at least one main filter layer (e.g., a second layer, a fourth layer), the main filter layer or layers (e.g., a second layer, a fourth layer) may be solvent-spun layer or layers, such as an electrospun (e.g., solvent-electrospun) layer or layers, or a centrifugal spun layer or layers. As used herein, a layer is a solvent spun layer if it was formed during a solvent spinning process, or if it comprises solvent spun fibers.

In some embodiments, the filter media may comprise at least one main filter layer, and the main filter layer or layers (e.g., a second layer, a fourth layer) may comprise synthetic fibers. Non-limiting examples of suitable synthetic fibers include nylon, poly(vinylidene fluoride), poly(acrylonitrile), poly(ether sulfone), and polyuria. In some embodiments, the filter media may comprise a blend where one or more components of the blend is a synthetic fiber (e.g., a blend comprising at least one type of synthetic fiber, a blend comprising at least two types of synthetic fibers, or a blend comprising three or more types of synthetic fibers). In some embodiments, the main filter layer or layers (if present, e.g., a second layer, a fourth layer) may comprise a relatively high amount of nylon fibers (e.g., up to 100 wt % nylon fibers). In some embodiments, one or more of the synthetic fibers may be continuous fibers. For example, in some embodiments the main filter layer(s) (e.g., a second layer, a fourth layer) includes 100% continuous synthetic fibers (e.g., 100% solvent spun fibers such as 100% electrospun fibers).

In embodiments where the filter media comprises at least one main filter layer, the fibers in the main filter layer or layers (e.g., a second layer, a fourth layer) may have any suitable average diameter. In some embodiments, the average diameter of the fibers in the main filter layer (e.g., a second layer, a fourth layer) is greater than or equal to 20 nm, greater than or equal to 40 nm, greater than or equal to 100 nm, greater than or equal to 200 nm, greater than or equal to 300 nm, or greater than or equal to 500 nm. In some embodiments, the average diameter of the fibers in the main filter layer or layers (e.g., a second layer, a fourth layer) is less than or equal to 1000 nm, less than or equal to 500 nm, less than or equal to 300 nm, less than or equal to 200 nm, less than or equal to 100 nm, or less than or equal to 40 nm. Combinations of the above-referenced ranges are also possible (e.g., greater than or equal to 20 nm and less than or equal to 1000 nm, greater than or equal to 40 nm and less than or equal to 500 nm, or greater than or equal to 40 nm and less than or equal to 300 nm). Other ranges are also possible.

In some embodiments where the filter media comprises at least one main filter layer, the fibers within the main filter layer (e.g., a second layer, a fourth layer) may have any suitable average length. In some embodiments, the average length of the fibers in the main filter layer or layers (e.g., a second layer, a fourth layer) may be greater than or equal to 1 inch, greater than or equal to 2 inches, greater than or equal to 5 inches, greater than or equal to 10 inches, greater than or equal to 20 inches, greater than or equal to 50 inches, greater than or equal to 100 inches, greater than or equal to 200 inches, or greater than or equal to 500 inches. In some embodiments, the average length of fibers in the main filter layer or layers (e.g., a second layer, a fourth layer) may be less than or equal to 1000 inches, less than or equal to 500 inches, less than or equal to 200 inches, less than or equal to 100 inches, less than or equal to 50 inches, less than or equal to 20 inches, less than or equal to 10 inches, or less than or equal to 5 inches. Combinations of the above-referenced properties are also possible (e.g., greater than or equal to 5 inches and less than or equal to 1000 inches). Other ranges are also possible. In some embodiments, the fibers within the main filter layer (e.g., a second layer, a fourth layer) may be continuous fibers or may comprise continuous fibers.

In some embodiments, the filter media may comprise at least one main filter layer, and the main filter layer or layers (e.g., a second layer, a fourth layer) may comprise one or more additives. In some embodiments, the additive may comprise a charge additive, such as sodium chloride. In some embodiments, the main filter layer or layers (e.g., a second layer, a fourth layer) may have a wt % of sodium chloride of greater than or equal to 0 wt %, greater than or equal to 2 wt %, greater than or equal to 4 wt %, greater than or equal to 6 wt %, or greater than or equal to 8 wt %. In some embodiments, the main filter layer or layers (e.g., a second layer, a fourth layer) may have a wt % of sodium chloride of less than or equal to 10 wt %, less than or equal to 8 wt %, less than or equal to 6 wt %, less than or equal to 4 wt %, or less than or equal to 2 wt %. Combinations of the above-referenced ranges are also possible (e.g., greater than or equal to 0 wt % and less than or equal to 10 wt %). Other ranges are also possible.

In some embodiments, the additive may comprise a UV-protective agent. In some embodiments, the main filter layer or layers (e.g., a second layer, a fourth layer) may have a wt % of the UV-protective agent of greater than or equal to 0 wt %, greater than or equal to 2 wt %, greater than or equal to 4 wt %, greater than or equal to 6 wt %, or greater than or equal to 8 wt %. In some embodiments, the main filter layer or layers (e.g., a second layer, a fourth layer) may have a wt % of the UV-protective agent of less than or equal to 10 wt %, less than or equal to 8 wt %, less than or equal to 6 wt %, less than or equal to 4 wt %, or less than or equal to 2 wt %. Combinations of the above-referenced ranges are also possible (e.g., greater than or equal to 0 wt % and less than or equal to 10 wt %). Other ranges are also possible.

In some embodiments, the additive may comprise an antioxidant. In some embodiments, the main filter layer or layers (e.g., a second layer, a fourth layer) may have a wt % of the antioxidant of greater than or equal to 0 wt %, greater than or equal to 2 wt %, greater than or equal to 4 wt %, greater than or equal to 6 wt %, or greater than or equal to 8 wt %. In some embodiments, the main filter layer or layers (e.g., a second layer, a fourth layer) may have a wt % of the antioxidant of less than or equal to 10 wt %, less than or equal to 8 wt %, less than or equal to 6 wt %, less than or equal to 4 wt %, or less than or equal to 2 wt %. Combinations of the above-referenced ranges are also possible (e.g., greater than or equal to 0 wt % and less than or equal to 10 wt %). Other ranges are also possible.

In embodiments where the filter media comprises at least one main filter layer, the main filter layer or layers (e.g., a second layer, a fourth layer) may have any suitable basis weight. In some embodiments, the main filter layer (e.g., a second layer, a fourth layer) may have a basis weight of greater than or equal to 0.01 $g/m^2$, greater than or equal to 0.03 $g/m^2$, greater than or equal to 0.05 $g/m^2$, greater than or equal to 0.1 $g/m^2$, greater than or equal to 0.3 $g/m^2$, greater than or equal to 0.5 $g/m^2$, greater than or equal to 1 $g/m^2$, greater than or equal to 3 $g/m^2$, greater than or equal to 5 g/m², greater than or equal to 10 g/m², or greater than or equal to 30 g/m². In some embodiments, the main filter layer (e.g., a second layer, a fourth layer) may have a basis weight of less than or equal to 40 g/m², less than or equal to 30 g/m², less than or equal to 10 g/m², less than or equal to 5 g/m², less than or equal to 3 g/m², less than or equal to 1 g/m², less than or equal to 0.5 g/m², less than or equal to 0.3 g/m², less than or equal to 0.1 g/m², less than or equal to 0.05 g/m², or less than or equal to 0.03 g/m². Combinations of the above-referenced ranges are also possible (e.g., greater than or equal to 0.01 g/m² and less than or equal to 40 g/m², greater than or equal to 0.03 g/m² and less than or equal to 30 g/m², or greater than or equal to 0.01 g/m² and less than or equal to 5 g/m²). Other ranges are also possible. The basis weight may be determined according to the standard ISO 536.

In some embodiments where the filter media comprises at least one main filter layer, the main filter layer or layers (e.g., a second layer, a fourth layer) may have a thickness of greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, greater than or equal to 200 microns, greater than or equal to 500 microns, greater than or equal to 1000 microns, greater than or equal to 2000 microns, greater than or equal to 3000 microns, or greater than or equal to 4000 microns. In some embodiments, the thickness may be less than or equal to 5000 microns, less than or equal to 4000 microns, less than or equal to 3000 microns, less than or equal to 2000 microns, less than or equal to 1000 microns, less than or equal to 500 microns, less than or equal to 200 microns, less than or equal to 100 microns, less than or equal to 50 microns, less than or equal to 20 microns, less than or equal to 10 microns, less than or equal to 5 microns, or less than or equal to 2 microns. Combinations of the above-referenced ranges are also possible (e.g., greater than or equal to 1 micron and less than or equal to 5000 microns, greater than or equal to 5 microns and less than or equal to 1000 microns, or greater than or equal to 10 microns and less than or equal to 500 microns). Other ranges are also possible. The thickness of the main filter layer or layers may be determined by using SEM cross-section imaging.

In some embodiments, the filter media may comprise one or more main filter layers, and the solidity of the main filter layer or layers (e.g., a second layer, a fourth layer) may be greater than or equal to 0.001, greater than or equal to 0.0025, greater than or equal to 0.005, greater than or equal to 0.01, greater than or equal to 0.025, greater than or equal to 0.05, greater than or equal to 0.1, greater than or equal to 0.25, greater than or equal to 0.5, greater than or equal to 1, greater than or equal to 2.5, greater than or equal to 5, greater than or equal to 10, or greater than or equal to 25. In some embodiments, the solidity or the main filter layer or layers (e.g., a second layer, a fourth layer) may be less than or equal to 50, less than or equal to 25, less than or equal to 10, less than or equal to 5, less than or equal to 2.5, less than or equal to 1, less than or equal to 0.5, less than or equal to 0.25, less than or equal to 0.1, less than or equal to 0.05, less than or equal to 0.025, less than or equal to 0.01, less than or equal to 0.005, or less than or equal to 0.0025. Combinations of the above-referenced ranges are also possible (e.g., greater than or equal to 0.001 and less than or equal to 50, or greater than or equal to 0.01 and less than or equal to 25). Other ranges are also possible.

In some embodiments, the filter media may comprise one or more main filter layers, and the pressure drop across the main filter layer or layers (e.g., a second layer, a fourth layer) may be greater than or equal to 0.5 mm $H_2O$, greater than or equal to 0.75 mm $H_2O$, greater than or equal to 1 mm $H_2O$, greater than or equal to 2.5 mm $H_2O$, greater than or equal to 5 mm $H_2O$, greater than or equal to 7.5 mm $H_2O$, greater than or equal to 10 mm $H_2O$, greater than or equal to 25 mm $H_2O$, or greater than or equal to 50 mm $H_2O$. In some embodiments, the pressure drop across the main filter layer or layers (e.g., a second layer, a fourth layer) may be less than or equal to 100 mm $H_2O$, less than or equal to 75 mm $H_2O$, less than or equal to 50 mm $H_2O$, less than or equal to 25 mm $H_2O$, less than or equal to 10 mm $H_2O$, less than or equal to 7.5 mm $H_2O$, less than or equal to 5 mm $H_2O$, less than or equal to 2.5 mm $H_2O$, less than or equal to 1 mm $H_2O$, or less than or equal to 0.75 mm $H_2O$. Combinations of the above-referenced ranges are also possible (e.g., greater than or equal to 0.5 mm $H_2O$ and less than or equal to 100 mm $H_2O$, or greater than or equal to 1 mm $H_2O$ and less than or equal to 75 mm $H_2O$). Other ranges are also possible. The pressure drop may be determined using ASTM D2 986-91.

As described above, in some embodiments, one or more of the layers may be a support layer. The support layer may be used to support one or more other layers of the media, such as a main-filter layer. In some cases, the support layer may be used to protect and/or cover one or more other layers of the media, such as a main-filter layer. For example, in some embodiments, the third layer is a support layer. In some embodiments, the first layer is a support layer. In certain embodiments, a fifth layer is a support layer. Properties of support layers will be described in further detail below.

References herein to a support layer or layers should be understood to refer to each support layer in the filter media independently (if any support layers are present at all). That is, each support layer that is present may independently have any or none of the properties described below. In some embodiments, two or more support layers in the filter media may have similar compositions and/or properties. In other embodiments, each support layer in the filter media may have different compositions and/or properties.

In some embodiments that comprise at least one support layer, the support layer or layers (e.g., a first layer, a third layer, a fifth layer) may be wetlaid layers. That is, in some embodiments the support layer or layers (e.g., a first layer, a third layer, a fifth layer) may be formed by a wetlaid process. In other embodiments, the support layer or layers (e.g., a first layer, a third layer, a fifth layer) may be non-wetlaid layers. That is, in some embodiments the support layer or layers (e.g., a first layer, a third layer, a fifth layer) may be formed by a a non-wet laid process (e.g., an air laid process, a carding process, a spinning process (e.g., a spunbond process)). In some embodiments, the support layer or layers may be spunbond layers, or layers formed by a spunbond process.

In some embodiments, the filter media may comprise one or more support layers and the support layer or layers (e.g., a first layer, a third layer, a fifth layer) may comprise synthetic fibers. The synthetic fibers may include any suitable type of synthetic polymer. Examples of suitable synthetic fibers include polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such lyocell, rayon), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multi-component fibers (i.e., fibers having multiple compositions such as bicomponent fibers). In some cases, synthetic fibers may include meltblown, meltspun, electrospun (e.g., melt, solvent), or centrifugal spun fibers, which may be formed of polymers described herein (e.g., polyester, polypropylene). In some embodiments, synthetic fibers may be staple fibers. In some embodiments, the synthetic fibers may be fibers comprising a flame retardant. The filter media, as well as each of the layers within the filter media, may also include combinations of more than one type of synthetic fiber. It should be understood that other types of synthetic fibers may also be used.

In some embodiments, the filter media may comprise a support layer or layers (e.g., a first layer, a third layer, a fifth layer), and the support layer or layers may comprise flame retardant fibers and/or fibers comprising a flame retardant. In some embodiments, the fibers comprising a flame retardant may be synthetic fibers. In general, the total weight percentage of coarse and/or fine diameter fibers, as described below, may include fibers comprising a flame retardant (e.g., flame retardant fibers).

In some embodiments, the filter media may comprise at least one support layer, and the support layer or layers may comprise coarse synthetic fibers. In some embodiments, the support layer or layers (e.g., a first layer, a third layer, a fifth layer) may comprise coarse synthetic fibers with an average diameter of greater than or equal to 4 microns, greater than or equal to 7 microns, greater than or equal to 10 microns, greater than or equal to 15 microns, greater than or equal to 17 microns, greater than or equal to 20 microns, greater than or equal to 25 microns, greater than or equal to 30 microns, greater than or equal to 35 microns, greater than or equal to 40 microns, greater than or equal to 45 microns, greater than or equal to 50 microns, or greater than or equal to 55 microns. In some embodiments, the support layer or layers (e.g., a first layer, a third layer, a fifth layer) may comprise coarse synthetic fibers with an average diameter of less than or equal to 60 microns, less than or equal to 55 microns, less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 17 microns, less than or equal to 15 microns, less than or equal to 10 microns, or less than or equal to 7 microns. Combinations of the above-referenced ranges are also possible (e.g., greater than or equal to 4 microns and less than or equal to 60 microns, greater than or equal to 7 microns and less than or equal to 40 microns, greater than or equal to 10 microns and less than or equal to 60 microns, or greater than or equal to 17 and less than or equal to 35 microns). Other ranges are also possible.

In embodiments in which the filter media comprises at least one support layer (e.g., a first layer, a third layer, a fifth layer) and the support layer or layers comprise coarse synthetic fibers, the average length of the coarse synthetic fibers in the support layer or layers may be any suitable value. In some embodiments, the average length of the coarse synthetic fibers in the support layer or layers (e.g., a first layer, a third layer, a fifth layer) is greater than or equal to 3 mm, greater than or equal to 6 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1000 mm, greater than or equal to 2000 mm, greater than or equal to 5000 mm, greater than or equal to 10000 mm, or greater than or equal to 20000 mm. In some embodiments, the average length of the coarse synthetic fibers in the support layer or layers (e.g., a first layer, a third layer, a fifth layer) is less than or equal to 25400 mm, less than or equal to 20000 mm, less than or equal to 10000 mm, less than or equal to 5000 mm, less than or equal to 2000 mm, less than or equal to 1000 mm, less than or equal to 500 mm, less than or equal to 200 mm, less than or equal to 100 mm, less than or equal to 50 mm, less than or equal to 20 mm, or less than or equal to 10 mm, less than or equal to 6 mm. Combinations of the above-referenced ranges are also possible (e.g., greater than or equal to 3 mm and less than or equal to 25400 mm, or greater than or equal to 6 and less than or equal to 25400 mm). Other ranges are also possible. In some embodiments, the coarse synthetic fibers are continuous fibers. In other embodiments, the coarse synthetic fibers are non-continuous fibers (e.g., staple fibers).

In some embodiments in which the filter media comprises a support layer or layers (e.g., a first layer, a third layer, a fifth layer) with coarse synthetic fibers, the wt % of the coarse synthetic fibers in the support layer (e.g., a first layer, a third layer, a fifth layer) may be greater than or equal to 1 wt %, greater than or equal to 2 wt %, greater than or equal to 5 wt %, greater than or equal to 10 wt %, greater than or equal to 20 wt %, greater than or equal to 30 wt %, greater than or equal to 50 wt %, greater than or equal to 70 wt %, or greater than or equal to 90 wt %. In some embodiments, the wt % of the coarse synthetic fibers in the support layer (e.g., a first layer, a third layer, a fifth layer) may be less than or equal to 100 wt %, less than or equal to 90 wt %, less than or equal to 70 wt %, less than or equal to 50 wt %, less than or equal to 30 wt %, less than or equal to 20 wt %, less than or equal to 10 wt %, less than or equal to 5 wt %, or less than or equal to 2 wt %. Combinations of the above-referenced ranges are also possible (e.g., greater than or equal to 1 wt % and less than or equal to 100 wt %, greater than or equal to 10 wt % and less than or equal to 100 wt %, or greater than or equal to 30 wt % and less than or equal to 100 wt %). Other ranges are also possible. In some embodiments, the wt % of coarse synthetic fibers in the support layer (e.g., a first layer, a third layer, a fifth layer) may be 100 wt %.

In some embodiments, the filter media may comprise a support layer or layers (e.g., a first layer, a third layer, a fifth layer), and the support layer or layers may comprise fine synthetic fibers. In such embodiments, the average diameter of the fine synthetic fibers may be any suitable value. In embodiments that comprise both fine synthetic fibers and coarse synthetic fibers, the average diameter of the fine synthetic fibers may be less than the average diameter of the coarse synthetic fibers present in the support layer or layers. In some embodiments, the support layer or layers (e.g., a first layer, a third layer, a fifth layer) may comprise fine synthetic fibers with an average diameter of greater than or equal to 1 micron, greater than or equal to 1.5 microns, greater than or equal to 2.5 microns, greater than or equal to 5 microns, greater than or equal to 7.5 microns, greater than or equal to 10 microns, greater than or equal to 12.5 microns, greater than or equal to 15 microns, or greater than or equal to 17.5 microns. In some embodiments, the support layer or layers (e.g., a first layer, a third layer, a fifth layer) may comprise fine synthetic fibers with an average diameter of less than or equal to 20 microns, less than or equal to 17.5 microns, less than or equal to 15 microns, less than or equal to 12.5 microns, less than or equal to 10 microns, less than or equal to 7.5 microns, less than or equal to 5 microns, less than or equal to 2.5 microns, or less than or equal to 1.5 microns. Combinations of the above-referenced ranges are also possible (e.g., greater than or equal to 1 micron and less than or equal to 20 microns, or greater than or equal to 1.5 microns and less than or equal to 10 microns). Other ranges are also possible.

In embodiments in which the filter media comprises at least one support layer (e.g., a first layer, a third layer, a fifth layer) and the support layer or layers comprise fine synthetic fibers, the average length of the fine synthetic fibers in the support layer or layers may be any suitable value. In some embodiments, the average length of the fine synthetic fibers in the support layer or layers (e.g., a first layer, a third layer, a fifth layer) is greater than or equal to 3 mm, greater than or equal to 6 mm, greater than or equal to 9 mm, greater than or equal to 12 mm, greater than or equal to 15 mm, greater than or equal to 18 mm, greater than or equal to 21 mm, greater than or equal to 24 mm, greater than or equal to 27 mm, greater than or equal to 50 mm, greater than or equal to 100 mm, greater than or equal to 200 mm, greater than or equal to 500 mm, greater than or equal to 1000 mm, greater than or equal to 2000 mm, greater than or equal to 5000 mm, greater than or equal to 10000 mm, or greater than or equal to 20000 mm. In some embodiments, the average length of the fine synthetic fibers in the support layer or layers is less than or equal to 25400 mm, less than or equal to 20000 mm, less than or equal to 10000 mm, less than or equal to 5000 mm, less than or equal to 2000 mm, less than or equal to 1000 mm, less than or equal to 500 mm, less than or equal to 200 mm, less than or equal to 100 mm, less than or equal to 50 mm, less than or equal to 30 mm, less than or equal to 27 mm, less than or equal to 24 mm, less than or equal to 21 mm, less than or equal to 18 mm, less than or equal to 15 mm, less than or equal to 12 mm, less than or equal to 9 mm, or less than or equal to 6 mm. Combinations of the above-referenced ranges are also possible (e.g., greater than or equal to 3 mm and less than or equal to 25400 mm, greater than or equal to 6 and less than or equal to 25400 mm, greater than or equal to 3 mm and less than or equal to 30 mm, or greater than or equal to 6 mm and less than or equal to 12 mm). Other ranges are also possible. In some embodiments, the fine synthetic fibers are continuous fibers (e.g., fibers formed by a meltblown or spunbond process). In other embodiments, the fine synthetic fibers are non-continuous fibers (e.g., staple fibers). In some embodiments in which the filter media comprises a support layer or layers with fine synthetic fibers, the wt % of the fine synthetic fibers in the support layer or layers (e.g., a first layer, a third layer, a fifth layer) may be greater than or equal to 0 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, or greater than or equal to 40 wt %, greater than or equal to 45 wt %. In some embodiments, the wt % of the fine synthetic fibers in the support layer or layers (e.g., a first layer, a third layer, a fifth layer) may be less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt %. Combinations of the above-referenced ranges are also possible (e.g., greater than or equal to 0 wt % and less than or equal to 50 wt %, or greater than or equal to 1 wt % and less than or equal to 30 wt %). Other ranges are also possible.

In some embodiments, the filter media may comprise a support layer or layers (e.g., a first layer, a third layer, a fifth layer), and the support layer or layers may comprise binder fibers. In general, binder fibers (if present) may be used to join fibers within the layer. In some embodiments, binder fibers comprise polymers with a lower melting point than one or more major component in the layer, such as certain fibers. Binder fibers may be monocomponent (e.g., polyethylene fibers, copolyester fibers) or multicomponent (e.g., bicomponent fibers). For example, a binder fiber may be a bicomponent fiber. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers. In general, the total weight percentage of coarse and/or fine diameter fibers may include binder fibers.

In some embodiments, the support layer or layers (e.g., a first layer, a third layer, a fifth layer) may comprise binder fibers with an average diameter of greater than or equal to 1 micron, greater than or equal to 2 microns, greater than or equal to 5 microns, greater than or equal to 10 microns, greater than or equal to 15 microns, greater than or equal to 20 microns, or greater than or equal to 25 microns. In some embodiments, the support layer or layers (e.g., a first layer, a third layer, a fifth layer) may comprise binder fibers with an average diameter of less than or equal to 30 microns, less than or equal to 25 microns, less than or equal to 20 microns, less than or equal to 15 microns, less than or equal to 10 microns, less than or equal to 5 microns, or less than or equal to 2 microns. Combinations of the above-referenced ranges are also possible (e.g., greater than or equal to 1 micron and less than or equal to 30 microns, or greater than or equal to 2 microns and less than or equal to 20 microns). Other ranges are also possible.

In embodiments in which the filter media comprises at least one support layer (e.g., a first layer, a third layer, a fifth layer) and the support layer or layers comprise binder fibers, the average length of the binder fibers in the support layer or layers may be any suitable value. In some embodiments, the average length of the binder fibers in the support layer or layers (e.g., a first layer, a third layer, a fifth layer) is greater than or equal to 3 mm, greater than or equal to 6 mm, greater than or equal to 9 mm, greater than or equal to 12 mm, greater than or equal to 15 mm, greater than or equal to 18 mm, greater than or equal to 21 mm, greater than or equal to 24 mm, or greater than or equal to 27 mm. In some embodiments, the average length of the binder fibers in the support layer or layers (e.g., a first layer, a third layer, a fifth layer) is less than or equal to 30 mm, less than or equal to 27 mm, less than or equal to 24 mm, less than or equal to 21 mm, less than or equal to 18 mm, less than or equal to 15 mm, less than or equal to 12 mm, less than or equal to 9 mm, or less than or equal to 6 mm. Combinations of the above-referenced ranges are also possible (e.g., greater than or equal to 3 mm and less than or equal to 30 mm, or greater than or equal to 6 mm and less than or equal to 12 mm). Other ranges are also possible.

In some embodiments in which the filter media comprises a support layer or layers (e.g., a first layer, a third layer, a fifth layer) with binder fibers, the wt % of the binder fibers in the support layer or layers may be greater than or equal to 0 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 40 wt %, greater than or equal to 50 wt %, greater than or equal to 60 wt %, greater than or equal to 70 wt %, or greater than or equal to 80 wt %. In some embodiments, the wt % of the binder fibers in the support layer or layers (e.g., a first layer, a third layer, a fifth layer) may be less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 25 wt %, less than or equal to 20 wt %, less than or equal to 15 wt %, less than or equal to 10 wt %, or less than or equal to 5 wt %. Combinations of the above-referenced ranges are also possible (e.g., greater than or equal to 0 wt % and less than or equal to 90 wt %, or greater than or equal to 10 wt % and less than or equal to 30 wt %). Other ranges are also possible.

In some embodiments, the filter media may comprise one or more support layers (e.g., a first layer, a third layer, a fifth layer), and the support layer or layers may comprise one or more binder resins. In general, binder resin may be used to join fibers within the layer. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible. In some such embodiments, the resin may comprise a polymeric resin comprising a covalently attached flame retardant.

The resin (if present) may be added to the fibers in any suitable manner including, for example, in the wet state. In some embodiments, the resin coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorohydrin) may be provided to the fibers, for example, by injection into the blend. In some embodiments, upon addition to the fibers, the resin is added in a manner such that one or more layer or the entire filter media is impregnated with the resin (e.g., the resin permeates throughout). In a multi-layered web, a resin may be added to each of the layers separately prior to combining the layers, or the resin may be added to the layer after combining the layers. In some embodiments, resin is added to the fibers while in a dry state, for example, by spraying or saturation impregnation, or any of the above methods. In other embodiments, a resin is added to a wet layer.

In certain embodiments, a binder may be present in a layer and the binder may comprise both binder fibers and binder resin.

In some embodiments, the filter media may comprise one or more support layers (e.g., a first layer, a third layer, a fifth layer), and the wt % of the binder resin in the support layer or layers (e.g., a first layer, a third layer, a fifth layer) may be greater than or equal to 0 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 40 wt %, greater than or equal to 50 wt %, greater than or equal to 60 wt %, greater than or equal to 70 wt %, or greater than or equal to 80 wt %. In some embodiments, the wt % of the binder resin in the support layer or layers (e.g., a first layer, a third layer, a fifth layer) may be less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 25 wt %, less than or equal to 20 wt %, less than or equal to 15 wt %, less than or equal to 10 wt %, or less than or equal to 5 wt %. Combinations of the above-referenced ranges are also possible (e.g., greater than or equal to 0 wt % and less than or equal to 90 wt %, or greater than or equal to 10 wt % and less than or equal to 30 wt %). Other ranges are also possible.

In some embodiments, the filter media may comprise at least one support layer, and the support layer or layers (e.g., a first layer, a third layer, a fifth layer) may comprise one or more additives. In some embodiments, the additive may comprise, for example, one or more of an antibacterial additive, an antifungal additive, a UV-protective agent, an antioxidant, or other component. In some embodiments, the support layer or layers (e.g., a first layer, a third layer, a fifth layer) may have a wt % of the additive of greater than or equal to 0 wt %, greater than or equal to 2 wt %, greater than or equal to 4 wt %, greater than or equal to 6 wt %, or greater than or equal to 8 wt %. In some embodiments, the support layer or layers (e.g., a first layer, a third layer, a fifth layer) may have a wt % of the additive of less than or equal to 10 wt %, less than or equal to 8 wt %, less than or equal to 6 wt %, less than or equal to 4 wt %, or less than or equal to 2 wt %. Combinations of the above-referenced ranges are also possible (e.g., greater than or equal to 0 wt % and less than or equal to 10 wt %). Other ranges are also possible. Each additive may each be independently added in one or more of the ranges described above.

In some embodiments where the filter media comprises at least one support layer (e.g., a first layer, a third layer, a fifth layer), the support layer or layers (e.g., a first layer, a third layer, a fifth layer) may have a thickness of greater than or equal to 0.05 mm, greater than or equal to 0.1 mm, greater than or equal to 0.25 mm, greater than or equal to 0.38 mm, greater than or equal to 0.5 mm, greater than or equal to 1 mm, greater than or equal to 2 mm, or greater than or equal to 3 mm. In some embodiments, the support layer or layers (e.g., a first layer, a third layer, a fifth layer) may have a thickness of less than or equal to 5 mm, less than or equal to 3 mm, less than or equal to 2 mm, less than or equal to 1 mm, less than or equal to 0.5 mm, less than or equal to 0.38 mm, less than or equal to 0.25 mm, or less than or equal to 0.1 mm. Combinations of the above-referenced ranges are also possible (e.g., greater than or equal to 0.25 mm and less than or equal to 2 mm, greater than or equal to 0.38 and less than or equal to 1 mm, greater than or equal to 0.05 mm and less than or equal to 5 mm, or greater than or equal to 0.1 mm and less than or equal to 3 mm). Other ranges are also possible. The thickness of the support layer or layers may be determined according to the standard ISO 534 at 50 kPa.

In embodiments where the filter media comprises at least one support layer (e.g., a first layer, a third layer, a fifth layer), the support layer or layers may have any suitable basis weight. In some embodiments, the support layer or layers (e.g., a first layer, a third layer, a fifth layer) may have a basis weight of greater than or equal to 10 g/m$^2$, greater than or equal to 20 g/m², greater than or equal to 35 g/m², greater than or equal to 40 g/m², greater than or equal to 80 g/m², greater than or equal to 120 g/m², greater than or equal to 150 g/m², greater than or equal to 200 g/m², or greater than or equal to 250 g/m². In some embodiments, the support layer or layers (e.g., a first layer, a third layer, a fifth layer) may have a basis weight of less than or equal to 300 g/m², less than or equal to 250 g/m², less than or equal to 200 g/m², less than or equal to 150 g/m², less than or equal to 120 g/m², less than or equal to 80 g/m², less than or equal to 40 g/m², less than or equal to 35 g/m², or less than or equal to 20 g/m². Combinations of the above-referenced ranges are also possible (e.g., greater than or equal to 10 g/m² and less than or equal to 300 g/m², greater than or equal to 10 g/m² and less than or equal to 150 g/m², greater than or equal to 20 g/m² and less than or equal to 200 g/m², greater than or equal to 40 g/m² and less than or equal to 120 g/m², or greater than or equal to 35 g/m² and less than or equal to 80 g/m²). Other ranges are also possible. The basis weight may be determined according to the standard ISO 536.

In some embodiments where the filter media comprises at least one support layer (e.g., a first layer, a third layer, a fifth layer), the support layer or layers (e.g., a first layer, a third layer, a fifth layer) may have a mean flow pore size of greater than or equal to 20 microns, greater than or equal to 50 microns, greater than or equal to 70 microns, greater than or equal to 100 microns, greater than or equal to 150 microns, greater than or equal to 200 microns, or greater than or equal to 250 microns. In some embodiments, the support layer or layers (e.g., a first layer, a third layer, a fifth layer) may have a mean flow pore size of less than or equal to 300 microns, less than or equal to 250 microns, less than or equal to 200 microns, less than or equal to 150 microns, less than or equal to 100 microns, less than or equal to 70 microns, or less than or equal to 50 microns. Combinations of the above-referenced ranges are also possible (e.g., greater than or equal to 20 microns and less than or equal to 300 microns, or greater than or equal to 50 microns and less than or equal to 150 microns). Other ranges are also possible. The mean flow pore size may be determined according to the standard ASTM F316-03.

In some embodiments, the filter media may comprise one or more support layers (e.g., a first layer, a third layer, a fifth layer), and the air permeability of the support layer or layers (e.g., a first layer, a third layer, a fifth layer) may be greater than or equal to 10 CFM, greater than or equal to 20 CFM, greater than or equal to 50 CFM, greater than or equal to 75 CFM, greater than or equal to 100 CFM, greater than or equal to 200 CFM, greater than or equal to 500 CFM, greater than or equal to 800 CFM, or greater than or equal to 1000 CFM. In some embodiments, the air permeability of the support layer or layers may be less than or equal to 1400 CFM, less than or equal to 1000 CFM, less than or equal to 800 CFM, less than or equal to 500 CFM, less than or equal to 200 CFM, less than or equal to 100 CFM, less than or equal to 75 CFM, less than or equal to 50 CFM, or less than or equal to 20 CFM. Combinations of the above-referenced ranges are also possible (e.g., greater than or equal to 10 CFM and less than or equal to 1400 CFM, greater than or equal to 20 CFM and less than or equal to 500 CFM, greater than or equal to 50 CFM and less than or equal to 800 CFM, or greater than or equal to 200 CFM and less than or equal to 500 CFM). Other ranges are also possible. The air permeability may be determined using TAPPI Method T251.

In some embodiments for which the filter media comprises a support layer or layers (e.g., a first layer, a third layer, a fifth layer), the support layer or layers may be capable of removing particulates at certain efficiency levels as measured by the EN1822:2009 standard as described herein. In some embodiments, the support layer may have an efficiency of greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 97%, greater than or equal to 99%, or greater than or equal to 99.5%. In some embodiments, the efficiency of the support layer or layers (e.g., a first layer, a third layer, a fifth layer) may be less than or equal to 99.5%, less than or equal to 99%, less than or equal to 97%, less than or equal to 95%, less than or equal to 90%, less than or equal to 85%, less than or equal to 80%, less than or equal to 70%, less than or equal to 60%, less than or equal to 50%, less than or equal to 40%, or less than or equal to 30%. Combinations of the above-referenced ranges are also possible (e.g., greater than or equal to 20% and less than or equal to 80%). In embodiments for which both a support layer and a main filter layer are present in a filter media, the main filter layer may have a higher efficiency than the efficiency of the support layer.

In some embodiments, the support layer (e.g., first layer, third layer, fifth layer) is flame retardant or comprises one or more flame retardant components. For instance, the support layer may comprise flame retardant fibers, a flame retardant binder, a flame retardant coating, and/or flame retardant additives (e.g., flame retardant particles, flame retardant flakes). The flame retardant component(s) may be introduced during fabrication (e.g., during a melt-blown process, a meltspun process, an electrospinning process, a centrifugal spinning process, a wet laid process, a dry laid process, or an air laid process), or may be added to a binder.

In embodiments for which the filter media comprises a support layer or layers (e.g., a first layer, a third layer, a fifth layer), the support layer or layers may have any suitable dry tensile strength in the cross direction. In some embodiments, the dry tensile strength in the cross direction of the support layer or layers (e.g., a first layer, a third layer, a fifth layer) is greater than or equal to 1 lb/in, greater than or equal to 2 lb/in, greater than or equal to 4 lb/in, greater than or equal to 6 lb/in, greater than or equal to 8 lb/in, greater than or equal to 10 lb/in, greater than or equal to 12 lb/in, greater than or equal to 15 lb/in, or greater than or equal to 17 lb/in. In some embodiments, the dry tensile strength in the cross direction of the support layer or layers (e.g., a first layer, a third layer, a fifth layer) is less than or equal to 20 lb/in, less than or equal to 17 lb/in, less than or equal to 15 lb/in, less than or equal to 12 lb/in, less than or equal to 10 lb/in, less than or equal to 8 lb/in, less than or equal to 6 lb/in, less than or equal to 4 lb/in, or less than or equal to 2 lb/in. Combinations of the above-referenced ranges are also possible (e.g., greater than or equal to 1 lb/in and less than or equal to 20 lb/in, or greater than or equal to 6 lb/in and less than or equal to 15 lb/in). Other ranges are also possible. The dry tensile strength in the cross direction may be determined according to the standard T494 om-96 using a test span of 4 in and a jaw separation speed of 1 in/min.

In some embodiments, the dry tensile strength in the machine direction of the support layer or layers (e.g., a first layer, a third layer, a fifth layer) is greater than or equal to 2 lb/in, greater than or equal to 5 lb/in, greater than or equal to 10 lb/in, greater than or equal to 15 lb/in, greater than or equal to 20 lb/in, greater than or equal to 25 lb/in, greater than or equal to 30 lb/in, greater than or equal to 35 lb/in, greater than or equal to 40 lb/in, greater than or equal to 45 lb/in, greater than or equal to 50 lb/in, or greater than or equal to 55 lb/in. In some embodiments, the dry tensile strength in the machine direction of the support layer or layers (e.g., a first layer, a third layer, a fifth layer) is less than or equal to 60 lb/in, less than or equal to 55 lb/in, less than or equal to 50 lb/in, less than or equal to 45 lb/in, less than or equal to 40 lb/in, less than or equal to 35 lb/in, less than or equal to 30 lb/in, less than or equal to 25 lb/in, less than or equal to 20 lb/in, less than or equal to 15 lb/in, less than or equal to 10 lb/in, or less than or equal to 5 lb/in. Combinations of the above-referenced ranges are also possible (e.g., greater than or equal to 2 lb/in and less than or equal to 60 lb/in, or greater than or equal to 10 lb/in and less than or equal to 40 lb/in). Other ranges are also possible. The dry tensile strength in the machine direction may be determined according to the standard T494 om-96 using a test span of 4 in and a jaw separation speed of 1 in/min.

In some embodiments where the filter media comprises at least one support layer (e.g., a first layer, a third layer, a fifth layer), the support layer or layers (e.g., a first layer, a third layer, a fifth layer) may have a dry Mullen Burst strength of greater than or equal to 20 psi, greater than or equal to 30 psi, greater than or equal to 50 psi, greater than or equal to 75 psi, greater than or equal to 100 psi, greater than or equal to 125 psi, greater than or equal to 150 psi, greater than or equal to 175 psi, greater than or equal to 200 psi, or greater than or equal to 225 psi. In some embodiments, the support layer or layers (e.g., a first layer, a third layer, a fifth layer) have a dry Mullen Burst strength of less than or equal to 250 psi, less than or equal to 225 psi, less than or equal to 200 psi, less than or equal to 175 psi, less than or equal to 150 psi, less than or equal to 125 psi, less than or equal to 100 psi, less than or equal to 75 psi, less than or equal to 50 psi, or less than or equal to 30 psi. Combinations of the above-referenced ranges are also possible (e.g., greater than or equal to 20 psi and less than or equal to 250 psi, or greater than or equal to 30 psi and less than or equal to 150 psi). Other ranges are also possible. The dry Mullen Burst strength may be determined according to the standard T403 om-91.

In embodiments where the filter media comprises at least one support layer (e.g., a first layer, a third layer, a fifth layer), the support layer or layers may have any suitable Gurley stiffness. In some embodiments, the Gurley stiffness in the cross direction of the support layer or layers (e.g., a first layer, a third layer, a fifth layer) is greater than or equal to 10 mg, greater than or equal to 20 mg, greater than or equal to 50 mg, greater than or equal to 100 mg, greater than or equal to 200 mg, greater than or equal to 500 mg, greater than or equal to 1000 mg, or greater than or equal to 2000 mg. In some embodiments, the Gurley stiffness in the cross direction of the support layer or layers (e.g., a first layer, a third layer, a fifth layer) is less than or equal to 3500 mg, less than or equal to 2000 mg, less than or equal to 1000 mg, less than or equal to 500 mg, less than or equal to 200 mg, less than or equal to 100 mg, less than or equal to 50 mg, or less than or equal to 20 mg. Combinations of the above-referenced ranges are also possible (e.g., greater than or equal to 10 mg and less than or equal to 3500 mg, or greater than or equal to 200 mg and less than or equal to 1000 mg). Other ranges are also possible. The stiffness may be determined using the Gurley stiffness (bending resistance) recorded in units of mm (equivalent to gu) in accordance with TAPPI T543 om-94.

In some embodiments, the Gurley stiffness in the machine direction of the support layer or layers (e.g., a first layer, a third layer, a fifth layer) is greater than or equal to 150 mg, greater than or equal to 200 mg, greater than or equal to 350 mg, greater than or equal to 500 mg, greater than or equal to 1000 mg, greater than or equal to 1500 mg, greater than or equal to 2000 mg, greater than or equal to 2500 mg, or greater than or equal to 3000 mg. In some embodiments, the Gurley stiffness in the machine direction of the support layer or layers (e.g., a first layer, a third layer, a fifth layer) is less than or equal to 3500 mg, less than or equal to 3000 mg, less than or equal to 2500 mg, less than or equal to 2000 mg, less than or equal to 1500 mg, less than or equal to 1000 mg, less than or equal to 500 mg, less than or equal to 350 mg, or less than or equal to 200 mg. Combinations of the above-referenced ranges are also possible (e.g., greater than or equal to 150 mg and less than or equal to 3500 mg, greater than or equal to 200 mg and less than or equal to 3500 mg, greater than or equal to 200 mg and less than or equal to 2000 mg, or greater than or equal to 350 mg and less than or equal to 2000 mg). Other ranges are also possible. The stiffness may be determined using the Gurley stiffness (bending resistance) recorded in units of mm (equivalent to gu) in accordance with TAPPI T543 om-94.

As described above, in some embodiments, adhesive may be present in the filter media in one or more locations (e.g., between the first layer and the second, and/or between the second layer and the third layer, etc.). References herein to an adhesive without specifying the location of that adhesive should be understood to refer to the adhesive present at each location in the filter media independently (if adhesive is present in any location at all). That is, at each location where the adhesive is present, the adhesive that is present there may independently have any or none of the properties described below. In some embodiments, two or more locations where adhesive is present in the filter media may comprise adhesive with similar compositions and/or properties. In other embodiments, each adhesive present in the filter media may have different compositions and/or properties.

In some embodiments, the adhesive or adhesives may be a solvent-based adhesive resin. As used herein, a solvent-based adhesive resin is an adhesive that is capable of undergoing a liquid to solid transition upon the evaporation of a solvent from the resin. Solvent-based adhesive resins may be applied while in the liquid state. Subsequently, the solvent that is present may evaporate to yield a solid adhesive. Solvent-based adhesives may thus be considered to be distinct from hot melt adhesives, which do not comprise volatile solvents (e.g., solvents that evaporate under normal operating conditions) and which typically undergo a liquid to solid transition as the adhesive cools.

Desirable properties for adhesives may include sufficient tackiness and open time (i.e., the amount of time that the adhesive remains tacky after being exposed to the ambient atmosphere). Without wishing to be bound by theory, the tackiness of an adhesive may depend on both the glass transition temperature of the adhesive and the molecular weight of any polymeric components of the adhesive. Higher values of glass transition and lower values of molecular weight may promote enhanced tackiness, and higher values of molecular weight may result in higher cohesion in the adhesive and higher bond strength. In some embodiments, adhesives having a glass transition temperature and/or molecular weight in one or more ranges described herein may provide appropriate values of both tackiness and open time. For example, the adhesive may be adapted and arranged to remain tacky for a relatively long time (e.g., the adhesive may remain tacky after full evaporation of any solvents initially present, and/or may be tacky indefinitely when held at room temperature). In some embodiments, the open time of the adhesive may be less than or equal to 24 hours, less than or equal to 12 hours, less than or equal to 6 hours, less than or equal to 1 hour, less than or equal to 30 minutes, less than or equal to 15 minutes, less than or equal to 10 minutes, less than or equal to 5 minutes, less than or equal to 3 minutes, less than or equal to 1 minute, less than or equal to 30 seconds, or less than or equal to 10 seconds. In some embodiments, the open time of the adhesive may be at least 1 second, at least 10 seconds, at least 15 seconds, at least 30 seconds, at least 1 minute, at least 3 minutes, at least 5 minutes, at least 10 minutes, at least 15 minutes, at least 30 minutes, at least 1 hour, at least 6 hours, or at least 12 hours. Combinations of the above-referenced ranges are also possible (e.g., at least 1 second and less than or equal to 24 hours). Other values are also possible.

It is also believed that exposure to isopropyl alcohol (IPA) vapor may cause a filter comprising an adhesive resin to have a high pressure drop due to dissolution of the adhesive by the IPA vapor, and that the presence of cross-linker in the adhesive may reduce this dissolution and pressure drop in some embodiments.

As described above, in some embodiments an adhesive may be present between a first layer and a second layer and/or between other layers of the media (e.g., between the second layer and a third layer). The adhesive may be used to coat one or more layers using a solvent-spraying process described herein, or using any other suitable process. Non-limiting examples of suitable adhesives include acrylates, acrylate copolymers, polyurethanes, polyesters, poly(vinyl alcohol), ethylene-vinyl acetate copolymers, silicone solvents, polyolefins, synthetic and/or natural rubber, synthetic elastomers, ethylene-acrylic acid copolymers, ethylene-methacrylate copolymers, ethylene-methyl methacrylate copolymers, poly(vinylidene chloride), polyamides, epoxies, melamine resins, poly(isobutylene), styrenic block copolymers, styrene-butadiene rubber, aliphatic urethane acrylates, and phenolics.

In embodiments in which three or more layers are present (e.g., first, second and third layers), each interface may include an adhesive independently chosen from the adhesives described herein. In some embodiments, an adhesive at a first interface (e.g., between first and second layers) is different from an adhesive at a second interface (e.g., between second and third adhesives). In other embodiments, the adhesives at different interfaces are the same.

In some embodiments when an adhesive is present, the adhesive may comprise a cross-linker. In some embodiments, the cross-linker is a small molecule (i.e., the cross-linker is not a polymer). In some embodiments, the small molecule cross-linker is one or more of carbodiimide, isocyanate, aziridine, a zirconium compound such as zirconium carbonate, a metal acid ester, a metal chelate, a multifunctional propylene imine, and an amino resin. In some embodiments, the adhesive comprises at least one polymer with one or more active sites that are capable of reacting with the cross-linker. Non-limiting examples of suitable reactive sites include alcohol groups, carboxylic acid groups, epoxy groups, amine groups, and amino groups.

In some embodiments, the adhesive does not comprise a small molecule cross-linker, but the polymeric molecules forming the adhesive may undergo self-crosslinking via functional groups attached to the polymer.

In some embodiments, a temperature may be applied to the adhesive in order to assist in solvent removal and/or in order to accelerate a rate of cross-linking. In some embodiments, the temperature may be greater than or equal to 24° C., greater than or equal to 40° C., greater than or equal to 50° C., greater than or equal to 60° C., greater than or equal to 70° C., greater than or equal to 80° C., greater than or equal to 90° C., greater than or equal to 100° C., greater than or equal to 110° C., greater than or equal to 120° C., greater than or equal to 130° C., or greater than or equal to 140° C. In some embodiments, the temperature may be less than or equal to 150° C., less than or equal to 140° C., less than or equal to 130° C., less than or equal to 120° C., less than or equal to 110° C., less than or equal to 100° C., less than or equal to 90° C., less than or equal to 80° C., less than or equal to 70° C., less than or equal to 60° C., less than or equal to 50° C., or less than or equal to 40° C. Combinations of the above-referenced ranges are also possible (e.g., greater than or equal to 24° C. and less than or equal to 150° C., or greater than or equal to 24° C. and less than or equal to 130° C.). Other ranges are also possible.

When present, the small molecule cross-linker may make up any suitable amount of the adhesive. In some embodiments, the wt % of the cross-linker with respect to the total mass of the adhesive and the cross-linker present in a specified location of the filter media (e.g., between two layers, such as between the first layer and the second layer, or between the second layer and the third layer) may be greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, greater than or equal to 10 wt %, greater than or equal to 15 wt %, greater than or equal to 20 wt %, or greater than or equal to 25 wt %. In some embodiments, the wt % of the small molecule cross-linker with respect to the total mass of the adhesive and the cross-linker present in a specified location (e.g., between two layers, such as between the first layer and the second layer, or between the second layer and the third layer) may be less than or equal to 30 wt %, less than or equal to 25 wt %, less than or equal to 20 wt %, less than or equal to 15 wt %, less than or equal to 10 wt %, less than or equal to 5 wt %, less than or equal to 2 wt %, less than or equal to 1 wt %, less than or equal to 0.5 wt %, or less than or equal to 0.2 wt %. Combinations of the above-referenced ranges are also possible (e.g., greater than or equal to 0.1 wt % and less than or equal to 30 wt %, or greater than or equal to 1 wt % and less than or equal to 20 wt %). Other ranges are also possible.

The adhesive and/or any small molecule cross-linkers comprised by the adhesive, if present, may be capable of undergoing a cross-linking reaction at any suitable temperature. In some embodiments, the cross-linker may be capable of undergoing a cross-linking reaction at a temperature of greater than or equal to 24° C., greater than or equal to 40° C., greater than or equal to 50° C., greater than or equal to 60° C., greater than or equal to 70° C., greater than or equal to 80° C., greater than or equal to 90° C., greater than or equal to 100° C., greater than or equal to 110° C., greater than or equal to 120° C., greater than or equal to 130° C., or greater than or equal to 140° C. In some embodiments, the adhesive and/or any small molecule cross-linkers comprised by the adhesive may be capable of undergoing a cross-linking reaction at a temperature of less than or equal to 150° C., less than or equal to 140° C., less than or equal to 130° C., less than or equal to 120° C., less than or equal to 110° C., less than or equal to 100° C., less than or equal to 90° C., less than or equal to 80° C., less than or equal to 70° C., less than or equal to 60° C., less than or equal to 50° C., or less than or equal to 40° C. Combinations of the above-referenced ranges are also possible (e.g., greater than or equal to 25° C. and less than or equal to 150° C., or greater than or equal to 25° C. and less than or equal to 130° C.). Other ranges are also possible.

In some embodiments in which an adhesive is present in at least one location in the filter media (e.g., between two layers, such as between the first layer and the second layer, or between the second layer and the third layer), the adhesive or adhesives may comprise a solvent prior to the application of the adhesive to a layer. In some embodiments, the adhesive or adhesives may be applied to the layer or filter media while dissolved or suspended in a solvent. Non-limiting examples of suitable solvents include water, hydrocarbon solvents, ketones, aromatic solvents, fluorinated solvents, toluene, heptane, acetone, n-butyl acetate, methyl ethyl ketone, methylene chloride, naphtha, and mineral spirits.

In some embodiments, the glass transition temperature of the adhesive(s) may be relatively low. In some embodiments, the glass transition temperature of the adhesive(s) may be less than or equal to 60° C., less than or equal to 50° C., less than or equal to 45° C., less than or equal to 40° C., less than or equal to 35° C., less than or equal to 30° C., less than or equal to 24° C., less than or equal to 25° C., less than or equal to 20° C., less than or equal to 15° C., less than or equal to 10° C., less than or equal to 5° C., less than or equal to 0° C., less than or equal to −5° C., less than or equal to −10° C., less than or equal to −20° C., less than or equal to −30° C., less than or equal to −40° C., less than or equal to −50° C., less than or equal to −60° C., less than or equal to −70° C., less than or equal to −80° C., less than or equal to −90° C., less than or equal to −100° C., or less than or equal to −110° C. In some embodiments, the glass transition temperature of the adhesive(s) may be greater than or equal to −125° C., greater than or equal to −110° C., greater than or equal to −100° C., greater than or equal to −90° C., greater than or equal to −80° C., greater than or equal to −70° C., greater than or equal to −60° C., greater than or equal to −50° C., greater than or equal to −40° C., greater than or equal to −30° C., greater than or equal to −20° C., greater than or equal to −10° C., greater than or equal to 0° C., greater than or equal to 5° C., greater than or equal to 10° C., greater than or equal to 24° C., greater than or equal to 25° C., greater than or equal to 40° C., or greater than or equal to 50° C. Combinations of the above-referenced ranges are also possible (e.g., greater than or equal to −125° C. and less than or equal to 60° C., or greater than or equal to −100° C. and less than or equal to 25° C.). Other ranges are also possible. The value of the glass transition temperature for an adhesive may be measured by differential scanning calorimetry.

The molecular weight of the adhesive may be selected as desired. In some embodiments, the number average molecular weight of the adhesive(s) may be greater than or equal to 10 kDa, greater than or equal to 30 kDa, greater than or equal to 50 kDa, greater than or equal to 100 kDa, greater than or equal to 300 kDa, greater than or equal to 500 kDa, greater than or equal to kDa, greater than or equal to 1000 kDa, greater than or equal to 2000 kDa, or greater than or equal to 3000 kDa. In some embodiments, the number average molecular weight of the adhesive(s) may be less than or equal to 5000 kDa, less than or equal to 4000 kDa, less than or equal to 3000 kDa, less than or equal to 1000 kDa, less than or equal to 500 kDa, less than or equal to 300 kDa, less than or equal to 100 kDa, less than or equal to 50 kDa, or less than or equal to 30 kDa. Combinations of the above-referenced ranges are also possible (e.g., greater than or equal to 10 kDa and less than or equal to 5000 kDa, or greater than or equal to 30 kDa and less than or equal to 3000 kDa). Other ranges are also possible. The number average molecular weight may be measured by light scattering.

In embodiments where the filter media comprises an adhesive in any single location (e.g., between two layers, such as between the first layer and the second layer, and/or between the second layer and the third layer), the adhesive or adhesives may have any suitable basis weight in that location. In some embodiments, the adhesive or adhesives may have a basis weight in any single location of greater than or equal to 0.05 g/m$^2$, greater than or equal to 0.1 g/m$^2$, greater than or equal to 0.2 g/m$^2$, greater than or equal to 0.5 g/m$^2$, greater than or equal to 1 g/m$^2$, greater than or equal to 2 g/m$^2$, or greater than or equal to 5 g/m$^2$. In some embodiments, the adhesive or adhesives may have a basis weight in any single location of less than or equal to 10 g/m$^2$, less than or equal to 5 g/m$^2$, less than or equal to 2 g/m$^2$, less than or equal to 1 g/m$^2$, less than or equal to 0.5 g/m$^2$, less than or equal to 0.2 g/m$^2$, or less than or equal to 0.1 g/m$^2$. Combinations of the above-referenced ranges are also possible (e.g., greater than or equal to 0.05 g/m$^2$ and less than or equal to 10 g/m$^2$, or greater than or equal to 0.1 g/m$^2$ and less than or equal to 5 g/m$^2$). Other ranges are also possible. The basis weight of the adhesive in any single location may be determined according to the standard ISO 536, where the basis weight of the filter media measured before the application of the adhesive to that location is subtracted from the basis weight measured after the application of the adhesive to that location to yield the basis weight of the adhesive in that location.

In embodiments where the filter media comprises one or more adhesives, the total amount of adhesive(s) in the filter media may have a total basis weight (i.e., the sum of the basis weights of the adhesive at each location) of greater than or equal to 0.05 g/m$^2$, greater than or equal to 0.1 g/m$^2$, greater than or equal to 0.2 g/m$^2$, greater than or equal to 0.5 g/m$^2$, greater than or equal to 1 g/m$^2$, greater than or equal to 2 g/m$^2$, or greater than or equal to 5 g/m$^2$. In some embodiments, the adhesive or adhesives may have a total basis weight of less than or equal to 10 g/m$^2$, less than or equal to 5 g/m$^2$, less than or equal to 2 g/m$^2$, less than or equal to 1 g/m$^2$, less than or equal to 0.5 g/m$^2$, less than or equal to 0.2 g/m$^2$, or less than or equal to 0.1 g/m$^2$. Combinations of the above-referenced ranges are also possible (e.g., greater than or equal to 0.05 g/m$^2$ and less than or equal to 10 g/m$^2$, or greater than or equal to 0.1 g/m$^2$ and less than or equal to 5 g/m$^2$). Other ranges are also possible.

In some embodiments, the filter media may comprise an adhesive in at least one location, and the adhesive may be capable of adhering one layer to another (e.g., the first layer to the second layer, and/or the second layer to the third layer) with a relatively large bond strength. In some embodiments, the adhesive or adhesives may adhere two layers together with a bond strength of greater than or equal to 100 g/in$^2$, greater than or equal to 150 g/in$^2$, greater than or equal to 200 g/in$^2$, greater than or equal to 500 g/in$^2$, greater than or equal to 750 g/in$^2$, greater than or equal to 1000 g/in$^2$, greater than or equal to 1250 g/in$^2$, greater than or equal to 1500 g/in$^2$, greater than or equal to 1750 g/in$^2$, greater than or equal to 2000 g/in$^2$, greater than or equal to 2250 g/in$^2$, greater than or equal to 2500 g/in$^2$, greater than or equal to 2750 g/in$^2$, greater than or equal to 3000 g/in$^2$, greater than or equal to 3250 g/in$^2$, greater than or equal to 3500 g/in$^2$, greater than or equal to 3750 g/in$^2$, greater than or equal to 4000 g/in², greater than or equal to 4250 g/in², greater than or equal to 4500 g/in², or greater than or equal to 4750 g/in². In some embodiments, the adhesive or adhesives may adhere two layers together with a bond strength of less than or equal to 5000 g/in², less than or equal to 4750 g/in², less than or equal to 4500 g/in², less than or equal to 4250 g/in², less than or equal to 4000 g/in², less than or equal to 3750 g/in², less than or equal to 3500 g/in², less than or equal to 3250 g/in², less than or equal to 3000 g/in², less than or equal to 2750 g/in², less than or equal to 2500 g/in², less than or equal to 2250 g/in², less than or equal to 2000 g/in², less than or equal to 1750 g/in², less than or equal to 1500 g/in², less than or equal to 1250 g/in², less than or equal to 1000 g/in², less than or equal to 750 g/in², less than or equal to 500 g/in², less than or equal to 200 g/in², or less than or equal to 150 g/in². Combinations of the above-referenced ranges are also possible (e.g., greater than or equal to 100 g/in² and less than or equal to 5000 g/in², or greater than or equal to 150 g/in² and less than or equal to 3000 g/in²). Other ranges are also possible. In some embodiments, the entire filter media as a whole has an internal bond strength in one or more ranges described above. The bond strength of the entire filter media as a whole is equivalent to the weakest bond strength between two layers of the media.

The bond strength (e.g., internal bond strength) between two layers (e.g., between a first layer and a second layer, between a second layer and a third layer) may be determined by using a z-directional peel strength test. In short, the bond strength is determined by mounting a 1"×1" sample on a steel block with dimensions 1"×1"×0.5" using double sided tape. The sample block is mounted onto the non-traversing head of a tensile tester and another steel block of the same size is connected to the traversing head with double sided tape. The traversing head is brought down and bonded to the sample on the steel block of the non-traversing head. Enough pressure is applied so that the steel blocks are bonded together via the mounted sample. The traversing head is moved at a traversing speed of 1"/min and the maximum load is found from the peak of a stress-strain curve. The bond strength (e.g., internal bond strength) between the two layers is considered to be equivalent to the maximum load.

In some embodiments, the filter media as a whole may have one or more desirable properties. For example, the filter media may be a high energy particulate air (HEPA) or ultra-low penetration air (ULPA) filter. These filters are required to remove particulates at an efficiency level of greater than 99.95% and 99.9995%, respectively, per EN1822:2009. In some embodiments, the filter media may remove particulates at an efficiency of greater than 95%, greater than 99.995%, or greater than 99.99995%, or up to 99.999995. In some embodiments, the filter media may be suitable for HVAC applications. That is, the filter media may have a particulate efficiency of greater than or equal to about 10% and less than or equal to about 90% or greater than or equal to about 35% and less than or equal to about 90%. A HEPA, ULPA, or HVAC filter media may comprise, for example, a pre-filter layer positioned upstream of a main filter layer and a support layer positioned downstream of the main filter layer. In some embodiments, a HEPA, ULPA, or HVAC filter may comprise a meltblown pre-filter layer (e.g., a meltblown polypropylene pre-filter layer with a basis weight between, e.g., 3 g/m² and 40 g/m²), an electrospun main filter layer (e.g., a nylon electrospun main filter layer with a basis weight between, e.g., 0.01 g/m² and 5 g/m² comprising an average fiber diameter between, e.g., 40 nm and 300 nm), and a support layer (e.g., a wetlaid synthetic support layer with a basis weight between, e.g., 35 and 80 g/m²). Other types of filter media and efficiencies are also possible. In some embodiments, a filter media may be a HEPA, ULPA, or HVAC filter and may be one component of a filter element as described in more detail below.

The filter media as a whole may have any suitable stiffness. In some embodiments, the Gurley stiffness in the cross direction of filter media is greater than or equal to 50 mg, greater than or equal to 100 mg, greater than or equal to 200 mg, greater than or equal to 500 mg, greater than or equal to 1000 mg, greater than or equal to 1500 mg, greater than or equal to 2000 mg, or greater than or equal to 3000 mg. In some embodiments, the Gurley stiffness in the cross direction of the filter media is less than or equal to 3500 mg, less than or equal to 3000 mg, less than or equal to 2000 mg, less than or equal to 1500 mg, less than or equal to 1000 mg, less than or equal to 500 mg, less than or equal to 200 mg, or less than or equal to 100 mg. Combinations of the above-referenced ranges are also possible (e.g., greater than or equal to 50 mg and less than or equal to 3000 mg, or greater than or equal to 100 mg and less than or equal to 1500 mg). Other ranges are also possible. The stiffness may be determined using the Gurley stiffness (bending resistance) recorded in units of mm (equivalent to gu) in accordance with TAPPI T543 om-94.

In some embodiments, the Gurley stiffness in the machine direction of the filter media is greater than or equal to 100 mg, greater than or equal to 150 mg, greater than or equal to 200 mg, greater than or equal to 350 mg, greater than or equal to 500 mg, greater than or equal to 1000 mg, greater than or equal to 1500 mg, greater than or equal to 2000 mg, greater than or equal to 2500 mg, or greater than or equal to 3000 mg. In some embodiments, the Gurley stiffness in the machine direction of the support layer or layers is less than or equal to 3500 mg, less than or equal to 3000 mg, less than or equal to 2500 mg, less than or equal to 2000 mg, less than or equal to 1500 mg, less than or equal to 1000 mg, less than or equal to 500 mg, less than or equal to 350 mg, less than or equal to 200 mg, or less than or equal to 150 mg. Combinations of the above-referenced ranges are also possible (e.g., greater than or equal to 100 mg and less than or equal to 3000 mg, or greater than or equal to 150 mg and less than or equal to 3000 mg). Other ranges are also possible. The stiffness may be determined using the Gurley stiffness (bending resistance) recorded in units of mm (equivalent to gu) in accordance with TAPPI T543 om-94.

Because it may be desirable to rate filter media or layer based on the relationship between penetration and pressure drop across the media, or particulate efficiency as a function of pressure drop across the media or web, filter media may be rated according to a value termed gamma value. Generally, higher gamma values are indicative of better filter performance, i.e., a high particulate efficiency as a function of pressure drop. Gamma value is expressed according to the following formula: Gamma=$(-\log_{10}$(MPPS penetration %/100)/pressure drop, mm $H_2O)\times100$, where MPPS penetration is equivalent to MPPS penetration as described below and can be measured using the EN1822:2009 standard as described below. The gamma may be measured prior to undergoing exposure to IPA vapor or after undergoing exposure to IPA vapor as described below. The MPPS penetration for any given value of gamma is the penetration at the MPPS measured when that value of gamma is measured. Unless otherwise specified, references to gamma should be taken to refer to a value of gamma measured prior to the filter media undergoing exposure to IPA vapor. In this case, the relevant MPPS is the value of MPPS prior to exposure to IPA vapor discharge and the relevant value of MPPS penetration is the MPPS penetration prior to exposure to IPA vapor discharge.

Penetration, often expressed as a percentage, is defined as follows: Pen (%)=$(C/C_0)*100$ where C is the particle concentration after passage through the filter and $C_0$ is the particle concentration before passage through the filter. Typical tests of penetration involve blowing dioctyl phthalate (DOP) particles through a filter media or layer and measuring the percentage of particles that penetrate through the filter media or layer. Penetration values described herein were determined using a TSI 3160 automated filter testing unit from TSI, Inc. equipped with a DiOctyl Phthalate generator for DOP aerosol testing based on the EN1822:2009 standard for MPPS DOP particles. In this test, a set of particles with average diameters varying from 0.04 microns to 0.3 microns are created by the particle generator. The instrument measures a penetration value across the filter media (or layer) by determining the DOP particle size at which the highest level of penetration was measured for the test, i.e., the most penetrating particle size (MPPS). Accordingly, all gamma values described herein refer to gamma values at the most penetrating particle size. All penetration values, and therefore gamma values described herein, were determined using a continuous loading of DOP particles and subjecting the upstream face of a layer to an airflow of 12 liters per minute over a 100 cm² face area of the fiber web, giving a media face velocity of 2 cm/s. Particles with sizes of 0.04 microns, 0.08 microns, 0.12 microns, 0.16 microns, 0.2 microns, 0.26 microns and 0.3 microns with a geometric standard deviation of less than 1.3 were generated and the filter media was exposed to particles of each size sequentially. The penetration of the particles as a function of particle size is plotted, and the data is fit with a parabolic function. Then, the maximum of the parabolic function is found; the particle size at the maximum is the most penetrating particle size (MPPS) and the penetration at the maximum is the penetration at the MPPS.

Pressure drop values (e.g., for determining gamma) are determined using a TSI 3160 automated filter testing unit from TSI, Inc. by an air resistance test based on the EN1822:2009 standard. The instrument measures a pressure drop across the filter media (or layer) when the filter media or layer is subjected to a 5.3 cm/second face velocity.

The filter media as a whole may have a relatively high value of gamma at the MPPS (e.g., prior to exposure to IPA vapor discharge). In some embodiments, the value of gamma for the filter media at the MPPS is greater than or equal to 16, greater than or equal to 18, greater than or equal to 20, greater than or equal to 25, greater than or equal to 50, greater than or equal to 75, greater than or equal to 100, greater than or equal to 125, greater than or equal to 150, greater than or equal to 175, greater than or equal to 200, or greater than or equal to 225. In some embodiments, the value of gamma for the filter media at the MPPS is less than or equal to 250, less than or equal to 225, less than or equal to 200, less than or equal to 175, less than or equal to 150, less than or equal to 125, less than or equal to 100, less than or equal to 75, less than or equal to 50, less than or equal to 25, less than or equal to 20, or less than or equal to 18. Combinations of the above-referenced ranges are also possible (e.g., greater than or equal to 16 and less than or equal to 250, or greater than or equal to 18 and less than or equal to 150). Other ranges are also possible.

The filter media as a whole may have any suitable basis weight. In some embodiments, the filter media may have a basis weight of greater than or equal to 20 g/m², greater than or equal to 40 g/m², greater than or equal to 50 g/m², greater than or equal to 75 g/m², greater than or equal to 100 g/m², greater than or equal to 125 g/m², greater than or equal to 150 g/m², greater than or equal to 175 g/m², greater than or equal to 200 g/m², greater than or equal to 225 g/m², greater than or equal to 250 g/m², or greater than or equal to 275 g/m². In some embodiments, the filter media may have a basis weight of less than or equal to 300 g/m², less than or equal to 275 g/m², less than or equal to 250 g/m², less than or equal to 225 g/m², less than or equal to 200 g/m², less than or equal to 175 g/m², less than or equal to 150 g/m², less than or equal to 125 g/m², less than or equal to 100 g/m², less than or equal to 75 g/m², less than or equal to 50 g/m², or less than or equal to 40 g/m². Combinations of the above-referenced ranges are also possible (e.g., greater than or equal to 20 g/m² and less than or equal to 300 g/m², or greater than or equal to 40 g/m² and less than or equal to 200 g/m²). Other ranges are also possible. The basis weight may be determined according to the standard ISO 536.

In some embodiments, the thickness of the filter media as a whole is greater than or equal to 0.075 mm, greater than or equal to 0.1 mm, greater than or equal to 0.25 mm, greater than or equal to 0.5 mm, greater than or equal to 0.75 mm, greater than or equal to 1 mm, or greater than or equal to 2.5 mm. In some embodiments, the thickness of the filter media is less than or equal to 5 mm, less than or equal to 2.5 mm, less than or equal to 1 mm, less than or equal to 0.75 mm, less than or equal to 0.5 mm, or less than or equal to 0.25 mm. Combinations of the above-referenced ranges are also possible (e.g., greater than or equal to 0.075 mm and less than or equal to 5 mm, or greater than or equal to 0.1 mm and less than or equal to 1 mm). Other ranges are also possible. The thickness of the filter media may be determined according to the standard ISO 534 at 50 kPa.

In some embodiments, the mean flow pore size of the filter media as a whole may be greater than or equal to 0.1 micron, greater than or equal to 0.2 microns, greater than or equal to 0.5 microns, greater than or equal to 1 micron, greater than or equal to 2 microns, greater than or equal to 5 microns, greater than or equal to 10 microns, greater than or equal to 20 microns, or greater than or equal to 40 microns. In some embodiments, the mean flow pore size of the filter media may be less than or equal to 60 microns, less than or equal to 40 microns, less than or equal to 20 microns, less than or equal to 10 microns, less than or equal to 5 microns, less than or equal to 2 microns, less than or equal to 1 micron, less than or equal to 0.5 microns, or less than or equal to 0.2 microns. Combinations of the above-referenced ranges are also possible (e.g., greater than or equal to 0.1 micron and less than or equal to 60 microns, or greater than or equal to 0.5 microns and less than or equal to 40 microns). Other ranges are also possible. The mean flow pore size may be determined according to the standard ASTM F316-03.

The pressure drop across the filter media as a whole may be any suitable value. In some embodiments, the pressure drop across the filter media may be greater than or equal to 0.5 mm $H_2O$, greater than or equal to 1 mm $H_2O$, greater than or equal to 2 mm $H_2O$, greater than or equal to 5 mm $H_2O$, greater than or equal to 10 mm $H_2O$, greater than or equal to 20 mm $H_2O$, greater than or equal to 50 mm $H_2O$, or greater than or equal to 100 mm $H_2O$. In some embodiments, the pressure drop across the filter media may be less than or equal to 200 mm $H_2O$, less than or equal to 100 mm $H_2O$, less than or equal to 50 mm $H_2O$, less than or equal to 20 mm $H_2O$, less than or equal to 10 mm $H_2O$, less than or equal to 5 mm $H_2O$, less than or equal to 2 mm $H_2O$, or less than or equal to 1 mm H$_2$O. Combinations of the above-referenced ranges are also possible (e.g., greater than or equal to 0.5 mm H$_2$O and less than or equal to 200 mm H$_2$O, or greater than or equal to 2 mm H$_2$O and less than or equal to 100 mm H$_2$O). Other ranges are also possible. The pressure drop may be determined using ASTM D2 986-91.

In some embodiments, the filter media as a whole may perform particularly well after being exposed to isopropyl alcohol (IPA) vapor. Such performance characteristics may include the filter media having a relatively low pressure drop after being exposed to IPA vapor, having a relatively low change in the pressure drop after IPA vapor exposure in comparison to the same media prior to IPA vapor exposure, having a high value of gamma at the MPPS after being exposed to IPA vapor, and/or having a relatively low change in the value of gamma after IPA vapor exposure in comparison to the same media prior to IPA vapor exposure.

In general, IPA vapor exposure is performed in accordance with the ISO 16890-4 standard. A filter media to be tested is cut into a 6 inch by 6 inch square and placed on a shelf of a metal rack. Then, the metal rack and the media are placed over a container comprising at least 250 mL of 99.9 wt % IPA. After this step, the metal rack, media, and container are placed inside a 24 inch by 18 inch by 11 inch chamber. A second container comprising 250 mL of 99.9 wt % IPA is then placed in the container over the top shelf of the metal rack, and the lid of the chamber is closed and tightly sealed. This setup is maintained at 70° F. and 50% relative humidity for at least 14 hours, after which the filter media is removed and allowed to dry for one hour at room temperature. Then, filter media properties post IPA exposure are measured.

In some embodiments, the maximum pressure drop of the filter media as a whole after IPA exposure may be greater than or equal to 1 mm H$_2$O, greater than or equal to 3 mm H$_2$O, greater than or equal to 5 mm H$_2$O, greater than or equal to 7.5 mm H$_2$O, greater than or equal to 10 mm H$_2$O, greater than or equal to 25 mm H$_2$O, greater than or equal to 50 mm H$_2$O, or greater than or equal to 75 mm H$_2$O. In some embodiments, the maximum pressure drop of the filter media after IPA exposure may be less than or equal to 100 mm H$_2$O, less than or equal to 75 mm H$_2$O, less than or equal to 50 mm H$_2$O, less than or equal to 25 mm H$_2$O, less than or equal to 10 mm H$_2$O, less than or equal to 7.5 mm H$_2$O, less than or equal to 5 mm H$_2$O, or less than or equal to 3 mm H$_2$O. Combinations of the above-referenced ranges are also possible (e.g., greater than or equal to 1 mm H$_2$O, and less than or equal to 100 mm H$_2$O, or greater than or equal to 3 mm H$_2$O and less than or equal to 75 mm H$_2$O). Other ranges are also possible. The pressure drop may be determined using ASTM D2 986-91.

In some embodiments, the maximum pressure drop of the filter media after IPA exposure may be fairly similar to the maximum pressure drop of the same filter media prior to IPA exposure. In some embodiments, the percent change in the maximum pressure drop of the filter media after IPA exposure may be less than or equal to 50%, less than or equal to 40%, less than or equal to 30%, less than or equal to 25%, less than or equal to 20%, less than or equal to 15%, less than or equal to 10%, or less than or equal to 5%. In some embodiments, the percent change in the maximum pressure drop of the filter media after IPA exposure may be greater than or equal to 0%, greater than or equal to 10%, greater than or equal to 20%, greater than or equal to 30%, or greater than or equal to 40%. Combinations of the above-referenced ranges are also possible (e.g., greater than or equal to 0% and less than or equal to 50%, or greater than or equal to 0% and less than or equal to 20%). Other ranges are also possible. The pressure drop may be determined using ASTM D2 986-91. The percent change in a value (e.g., the pressure drop) is defined by the following equation: percent change=|(final value)−(initial value)|/(initial value)*100.

In some embodiments, the filter media may have a relatively high value of gamma at the MPPS after being exposed to IPA vapor. In some embodiments, the filter media may have a value of gamma at the MPPS after being exposed to IPA vapor of greater than or equal to 14, greater than or equal to 18, greater than or equal to 20, greater than or equal to 40, greater than or equal to 60, or greater than or equal to 80. In some embodiments, the filter media may have a value of gamma at the MPPS after being exposed to IPA vapor of less than or equal to 100, less than or equal to 80, less than or equal to 60, less than or equal to 40, less than or equal to 20, or less than or equal to 18. Combinations of the above-referenced ranges are also possible (e.g., greater than or equal to 14 and less than or equal to 100, or greater than or equal to 18 and less than or equal to 60). Other values are also possible.

In some embodiments, the gamma value of the filter media as a whole after IPA exposure may be fairly similar to the gamma value of the same filter media prior to IPA exposure. In some embodiments, the percent change in the gamma value of the filter media after IPA exposure may be less than or equal to 60%, less than or equal to 50%, less than or equal to 40%, less than or equal to 30%, less than or equal to 25%, less than or equal to 20%, less than or equal to 15%, less than or equal to 10%, or less than or equal to 5%. In some embodiments, the percent change in the gamma value of the filter media after IPA exposure may be greater than or equal to 0%, greater than or equal to 10%, greater than or equal to 20%, greater than or equal to 30%, greater than or equal to 40%, or greater than or equal to 50%. Combinations of the above-referenced ranges are also possible (e.g., greater than or equal to 0% and less than or equal to 60%, or greater than or equal to 0% and less than or equal to 40%). Other ranges are also possible. The percent change in a value (e.g., value of gamma) is defined by the following equation: percent change=|(final value)−(initial value)|/(initial value)*100.

In some embodiments, the PAO loading capacity of the filter media as a whole may be greater than or equal to 3 g/m$^2$, greater than or equal to 5 g/m$^2$, greater than or equal to 10 g/m$^2$, greater than or equal to 20 g/m$^2$, greater than or equal to 50 g/m$^2$, greater than or equal to 75 g/m$^2$, greater than or equal to 100 g/m$^2$, or greater than or equal to 150 g/m$^2$. In some embodiments, the PAO loading capacity of the filter media may be less than or equal to 200 g/m$^2$, less than or equal to 150 g/m$^2$, less than or equal to 100 g/m$^2$, less than or equal to 75 g/m$^2$, less than or equal to 50 g/m$^2$, less than or equal to 20 g/m$^2$, less than or equal to 10 g/m$^2$, or less than or equal to 5 g/m$^2$. Combinations of the above-ranges are also possible (e.g., greater than or equal to 3 g/m$^2$ and less than or equal to 200 g/m$^2$, or greater than or equal to 5 g/m$^2$ and less than or equal to 150 g/m$^2$). Other ranges are also possible. The PAO loading capacity of the filter media may be determined by loading 491 cm$^2$ of the filter media with PAO oil at a loading rate of 120 mg/m$^3$ and at a media face velocity of 5.3 cm/second until the pressure drop across the filter media rises by 250 Pa. The PAO particles may be generated by a Laskin nozzle and may have a median diameter of 0.25 microns. The PAO loading capacity was determined by weighing the filter media both prior to and after the test and dividing the measured increase in mass by the area of the filter media to obtain the PAO loading capacity per unit area of the filter media.

In some embodiments, the NaCl loading capacity of the filter media as a whole may be greater than or equal to 0.1 g/m², greater than or equal to 0.3 g/m², greater than or equal to 0.5 g/m², greater than or equal to 1 g/m², greater than or equal to 2 g/m², greater than or equal to 5 g/m², greater than or equal to 7.5 g/m², greater than or equal to 10 g/m², greater than or equal to 12.5 g/m², greater than or equal to 15 g/m², greater than or equal to 17.5 g/m², greater than or equal to 20 g/m², greater than or equal to 22.5 g/m², greater than or equal to 25 g/m², or greater than or equal to 27.5 g/m². In some embodiments, the NaCl loading capacity of the filter media may be less than or equal to 30 g/m², less than or equal to 27.5 g/m², less than or equal to 25 g/m², less than or equal to 22.5 g/m², less than or equal to 20 g/m², less than or equal to 17.5 g/m², less than or equal to 15 g/m², less than or equal to 12.5 g/m², less than or equal to 10 g/m², less than or equal to 7.5 g/m², less than or equal to 5 g/m², less than or equal to 2 g/m², less than or equal to 1 g/m², less than or equal to 0.5 g/m², or less than or equal to 0.3 g/m². Combinations of the above-referenced ranges are also possible (e.g., greater than or equal to 0.1 g/m² and less than or equal to 30 g/m², or greater than or equal to 0.3 g/m² and less than or equal to 20 g/m²). Other ranges are also possible. The NaCl loading capacity of the filter media may be determined by exposing a filter media with a nominal exposed area of 100 cm² to NaCl particles with a median diameter of 0.26 microns at a concentration of 15 mg/m³ and a face velocity of 5.3 cm/second. NaCl loading was determined using an 8130 CertiTest™ automated filter testing unit from TSI, Inc. equipped with a sodium chloride generator. The average particle size created by the salt particle generator was 0.26 micron mass mean diameter. The 8130 was run in a continuous mode with one pressure drop reading approximately every minute. The test was run using a 100 cm² filter media sample at a flow rate of 32 liters per minute (face velocity of 5.3 cm/sec) containing 15 mg/m³ of NaCl until the pressure drop across the filter media increased by 250 Pa. The NaCl loading capacity was determined by weighing the filter media both prior to and after the test and dividing the measured increase in mass by the area of the filter media to obtain the NaCl loading capacity per unit area of the filter media.

In some embodiments, the air permeability of the filter media as a whole may be greater than or equal to 0.6 CFM, greater than or equal to 1 CFM, greater than or equal to 1.4 CFM, greater than or equal to 5 CFM, greater than or equal to 10 CFM, greater than or equal to 20 CFM, greater than or equal to 67 CFM, greater than or equal to 100 CFM, or greater than or equal to 200 CFM. In some embodiments, the air permeability of the filter media may be less than or equal to 260 CFM, less than or equal to 200 CFM, less than or equal to 100 CFM, less than or equal to 67 CFM, less than or equal to 20 CFM, less than or equal to 10 CFM, less than or equal to 5 CFM, less than or equal to 1.4 CFM, or less than or equal to 1 CFM. Combinations of the above-referenced ranges are also possible (e.g., greater than or equal to 0.6 CFM and less than or equal to 260 CFM, or greater than or equal to 1.4 CFM and less than or equal to 67 CFM). Other ranges are also possible. The air permeability may be determined using TAPPI Method T251.

The solidity of the filter media as whole may be any suitable value. In some embodiments, the filter media has a solidity of greater than or equal to 0.0001, greater than or equal to 0.0002, greater than or equal to 0.0005, greater than or equal to 0.001, greater than or equal to 0.002, greater than or equal to 0.005, greater than or equal to 0.01, greater than or equal to 0.02, greater than or equal to 0.05, greater than or equal to 1, greater than or equal to 2, greater than or equal to 5, greater than or equal to 10, or greater than or equal to 25. In some embodiments, the filter media has a solidity of less than or equal to 50, less than or equal to 25, less than or equal to 10, less than or equal to 5, less than or equal to 2, less than or equal to 1, less than or equal to 0.5, less than or equal to 0.2, less than or equal to 0.1, less than or equal to 0.05, less than or equal to 0.02, less than or equal to 0.01, less than or equal to 0.005, less than or equal to 0.002, less than or equal to 0.001, less than or equal to 0.0005, or less than or equal to 0.0002. Combinations of the above-referenced ranges are also possible (e.g., greater than or equal to 0.0001 and less than or equal to 50, or greater than or equal to 0.001 and less than or equal to 25). Other ranges are also possible. Solidity may be determined by using the following formula: solidity %=[basis weight/(fiber density*thickness)] *100. The basis weight and thickness may be determined as described herein. The porosity can be derived from the solidity based on the following equation solidity (%)=100−porosity (%).

In some embodiments, the dry tensile strength of the filter media as a whole in the cross direction may be greater than or equal to 3 lb/in, greater than or equal to 4 lb/in, greater than or equal to 5 lb/in, greater than or equal to 10 lb/in, greater than or equal to 15 lb/in, greater than or equal to 20 lb/in, greater than or equal to 25 lb/in, greater than or equal to 30 lb/in, greater than or equal to 35 lb/in, greater than or equal to 40 lb/in, greater than or equal to 45 lb/in, greater than or equal to 50 lb/in, greater than or equal to 55 lb/in, greater than or equal to 60 lb/in, greater than or equal to 65 lb/in, or greater than or equal to 70 lb/in. In some embodiments, the dry tensile strength of the filter media in the cross direction may be less than or equal to 75 lb/in, less than or equal to 70 lb/in, less than or equal to 65 lb/in, less than or equal to 60 lb/in, less than or equal to 55 lb/in, less than or equal to 50 lb/in, less than or equal to 45 lb/in, less than or equal to 40 lb/in, less than or equal to 35 lb/in, less than or equal to 30 lb/in, less than or equal to 25 lb/in, less than or equal to 20 lb/in, less than or equal to 15 lb/in, less than or equal to 10 lb/in, less than or equal to 5 lb/in, or less than or equal to 4 lb/in. Combinations of the above-referenced ranges are also possible (e.g., greater than or equal to 3 lb/in and less than or equal to 75 lb/in, or greater than or equal to 4 lb/in and less than or equal to 50 lb/in). Other ranges are also possible. The dry tensile strength in the cross direction may be determined according to the standard T494 om-96 using a test span of 4 in and a jaw separation speed of 1 in/min.

In some embodiments, the dry tensile strength of the filter media as a whole in the machine direction may be greater than or equal to 6 lb/in, greater than or equal to 10 lb/in, greater than or equal to 20 lb/in, greater than or equal to 30 lb/in, greater than or equal to 40 lb/in, greater than or equal to 50 lb/in, greater than or equal to 60 lb/in, greater than or equal to 70 lb/in, greater than or equal to 80 lb/in, greater than or equal to 90 lb/in, greater than or equal to 100 lb/in, greater than or equal to 110 lb/in, greater than or equal to 120 lb/in, greater than or equal to 130 lb/in, or greater than or equal to 140 lb/in. In some embodiments, the dry tensile strength of the filter media in the machine direction may be less than or equal to 150 lb/in, less than or equal to 140 lb/in, less than or equal to 130 lb/in, less than or equal to 120 lb/in, less than or equal to 110 lb/in, less than or equal to 100 lb/in, less than or equal to 90 lb/in, less than or equal to 80 lb/in, less than or equal to 70 lb/in, less than or equal to 60 lb/in, less than or equal to 50 lb/in, less than or equal to 40 lb/in, less than or equal to 30 lb/in, less than or equal to 20 lb/in, or less than or equal to 10 lb/in. Combinations of the above-referenced ranges are also possible (e.g., greater than or equal to 6 lb/in and less than or equal to 150 lb/in, or greater than or equal to 10 lb/in and less than or equal to 100 lb/in). Other ranges are also possible. The dry tensile strength in the machine direction may be determined according to the standard T494 om-96 using a test span of 4 in and a jaw separation speed of 1 in/min.

In some embodiments, the wet tensile strength of the filter media as a whole in the cross direction may be greater than or equal to 3 lb/in, greater than or equal to 4 lb/in, greater than or equal to 5 lb/in, greater than or equal to 10 lb/in, greater than or equal to 15 lb/in, greater than or equal to 20 lb/in, greater than or equal to 25 lb/in, greater than or equal to 30 lb/in, greater than or equal to 35 lb/in, greater than or equal to 40 lb/in, greater than or equal to 45 lb/in, greater than or equal to 50 lb/in, greater than or equal to 55 lb/in, greater than or equal to 60 lb/in, greater than or equal to 65 lb/in, or greater than or equal to 70 lb/in. In some embodiments, the wet tensile strength of the filter media in the cross direction may be less than or equal to 75 lb/in, less than or equal to 70 lb/in, less than or equal to 65 lb/in, less than or equal to 60 lb/in, less than or equal to 55 lb/in, less than or equal to 50 lb/in, less than or equal to 45 lb/in, less than or equal to 40 lb/in, less than or equal to 35 lb/in, less than or equal to 30 lb/in, less than or equal to 25 lb/in, less than or equal to 20 lb/in, less than or equal to 15 lb/in, less than or equal to 10 lb/in, less than or equal to 5 lb/in, or less than or equal to 4 lb/in. Combinations of the above-referenced ranges are also possible (e.g., greater than or equal to 3 lb/in and less than or equal to 75 lb/in, or greater than or equal to 4 lb/in and less than or equal to 50 lb/in). Other ranges are also possible. The wet tensile strength in the cross direction may be determined according to the standard T494 om-96 using a test span of 4 in and a jaw separation speed of 1 in/min.

In some embodiments, the wet tensile strength of the filter media as a whole in the machine direction may be greater than or equal to 6 lb/in, greater than or equal to 10 lb/in, greater than or equal to 20 lb/in, greater than or equal to 30 lb/in, greater than or equal to 40 lb/in, greater than or equal to 50 lb/in, greater than or equal to 60 lb/in, greater than or equal to 70 lb/in, greater than or equal to 80 lb/in, greater than or equal to 90 lb/in, greater than or equal to 100 lb/in, greater than or equal to 110 lb/in, greater than or equal to 120 lb/in, greater than or equal to 130 lb/in, or greater than or equal to 140 lb/in. In some embodiments, the wet tensile strength of the filter media in the machine direction may be less than or equal to 150 lb/in, less than or equal to 140 lb/in, less than or equal to 130 lb/in, less than or equal to 120 lb/in, less than or equal to 110 lb/in, less than or equal to 100 lb/in, less than or equal to 90 lb/in, less than or equal to 80 lb/in, less than or equal to 70 lb/in, less than or equal to 60 lb/in, less than or equal to 50 lb/in, less than or equal to 40 lb/in, less than or equal to 30 lb/in, less than or equal to 20 lb/in, or less than or equal to 10 lb/in. Combinations of the above-referenced ranges are also possible (e.g., greater than or equal to 6 lb/in and less than or equal to 150 lb/in, or greater than or equal to 10 lb/in and less than or equal to 100 lb/in). Other ranges are also possible. The dry tensile strength in the machine direction may be determined according to the standard T494 om-96 using a test span of 4 in and a jaw separation speed of 1 in/min.

The dry Mullen Burst strength of the filter media as a whole may be any suitable value. In some embodiments, the dry Mullen Burst strength of the filter media may be greater than or equal to 10 psi, greater than or equal to 20 psi, greater than or equal to 50 psi, greater than or equal to 75 psi, greater than or equal to 100 psi, greater than or equal to 125 psi, greater than or equal to 150 psi, greater than or equal to 175 psi, greater than or equal to 200 psi, greater than or equal to 225 psi, greater than or equal to 250 psi, or greater than or equal to 275 psi. In some embodiments, the dry Mullen Burst strength of the filter media may be less than or equal to 300 psi, less than or equal to 275 psi, less than or equal to 250 psi, less than or equal to 225 psi, less than or equal to 200 psi, less than or equal to 175 psi, less than or equal to 150 psi, less than or equal to 125 psi, less than or equal to 100 psi, less than or equal to 75 psi, less than or equal to 50 psi, or less than or equal to 20 psi. Combinations of the above-referenced ranges are also possible (e.g., greater than or equal to 10 psi and less than or equal to 300 psi, or greater than or equal to 20 psi and less than or equal to 200 psi). Other ranges are also possible. The dry Mullen Burst strength may be determined according to the standard T403 om-91.

The wet Mullen Burst strength of the filter media as a whole may be any suitable value. In some embodiments, the wet Mullen Burst strength of the filter media may be greater than or equal to 5 psi, greater than or equal to 10 psi, greater than or equal to 20 psi, greater than or equal to 30 psi, greater than or equal to 40 psi, greater than or equal to 50 psi, greater than or equal to 60 psi, greater than or equal to 70 psi, greater than or equal to 80 psi, greater than or equal to 90 psi, greater than or equal to 100 psi, greater than or equal to 110 psi, greater than or equal to 120 psi, greater than or equal to 130 psi, greater than or equal to 140 psi, greater than or equal to 150 psi, greater than or equal to 160 psi, greater than or equal to 170 psi, greater than or equal to 180 psi, or greater than or equal to 190 psi. In some embodiments, the wet Mullen Burst strength of the filter media may be less than or equal to 200 psi, less than or equal to 190 psi, less than or equal to 180 psi, less than or equal to 170 psi, less than or equal to 160 psi, less than or equal to 150 psi, less than or equal to 140 psi, less than or equal to 130 psi, less than or equal to 120 psi, less than or equal to 110 psi, less than or equal to 100 psi, less than or equal to 90 psi, less than or equal to 80 psi, less than or equal to 70 psi, less than or equal to 60 psi, less than or equal to 50 psi, less than or equal to 40 psi, less than or equal to 30 psi, less than or equal to 20 psi, or less than or equal to 10 psi. Combinations of the above-referenced ranges are also possible (e.g., greater than or equal to 5 psi and less than or equal to 200 psi, or greater than or equal to 10 psi and less than or equal to 150 psi). Other ranges are also possible. The dry Mullen Burst strength may be determined according to the standard T403 om-91.

In some embodiments, the Gurley stiffness of the filter media as a whole in the cross direction may be greater than or equal to 50 mg, greater than or equal to 100 mg, greater than or equal to 200 mg, greater than or equal to 500 mg, greater than or equal to 1000 mg, greater than or equal to 1500 mg, or greater than or equal to 2000 mg. In some embodiments, the Gurley stiffness of the filter media in the cross direction may be less than or equal to 3000 mg, less than or equal to 2000 mg, less than or equal to 1500 mg, less than or equal to 1000 mg, less than or equal to 500 mg, less than or equal to 200 mg, or less than or equal to 100 mg. Combinations of the above-referenced ranges are also possible (e.g., greater than or equal to 50 mg and less than or equal to 3000 mg, or greater than or equal to 100 mg and less than or equal to 3000 mg). Other ranges are also possible.

The stiffness may be determined using the Gurley stiffness (bending resistance) recorded in units of mm (equivalent to gu) in accordance with TAPPI T543 om-94.

In some embodiments, the Gurley stiffness of the filter media as a whole in the machine direction may be greater than or equal to 100 mg, greater than or equal to 150 mg, greater than or equal to 200 mg, greater than or equal to 500 mg, greater than or equal to 1000 mg, or greater than or equal to 2000 mg. In some embodiments, the Gurley stiffness of the filter media in the machine direction may be less than or equal to 3000 mg, less than or equal to 2000 mg, less than or equal to 1000 mg, less than or equal to 500 mg, less than or equal to 200 mg, or less than or equal to 150 mg. Combinations of the above-referenced ranges are also possible (e.g., greater than or equal to 100 mg and less than or equal to 300 mg, or greater than or equal to 150 mg and less than or equal to 2000 mg). Other ranges are also possible. The stiffness may be determined using the Gurley stiffness (bending resistance) recorded in units of mm (equivalent to gu) in accordance with TAPPI T543 om-94.

In some embodiments, the filter media as a whole is flame retardant and/or includes one or more flame retardants described herein in one or more of the layers. For instance, the filter media may have a B2 rating according to DIN4102-1.

In some embodiments, a filter media comprises a first layer and a second layer, and the second layer is formed of fibers having an average fiber diameter of less than 1 micron. An adhesive may be present between the first layer and the second layer, and the first layer may be bonded to the second layer by the adhesive. The filter media may have a stiffness of greater than or equal to 200 mg and a bond strength between the first and second layers of greater than or equal to 150 g/in$^2$. The filter media may also exhibits gamma value of greater than or equal to 18 at the most penetrating particle size when subjected to a penetration test using 0.02-0.3 micron particles traveling at a face velocity of approximately 2.0 cm/sec, and when subjected to an air resistance test at a face velocity of approximately 5.3 cm/sec.

In some embodiments, a filter media comprises a first layer a second layer formed of fibers having an average fiber diameter of less than 1 micron, an adhesive between the first layer and the second layer. The first layer may be bonded to the second layer by the adhesive. The adhesive may comprise a solvent-based resin comprising a polymer having a glass transition temperature of less than or equal to 25° C.

In some embodiments, a method for fabricating a filter media comprises spraying a composition comprising a solvent-based adhesive resin and a cross-linking agent onto a first layer to form an adhesive-coated first layer, performing a solvent-based spinning process to deposit fibers onto the adhesive-coated first layer, and laminating the second layer to a third layer such that the third layer is positioned on a side of the second layer opposite the first layer. The fibers in the second layer may have an average fiber diameter of less than 1 micron and form a second layer.

In some embodiments, a filter media comprises a first layer, a second layer formed of fibers having an average fiber diameter of less than 1 micron, and an adhesive between the first layer and the second layer. The adhesive between the first layer and the second layer may be present in an amount of less than 10 gsm. The first layer may be bonded to the second layer by the adhesive, and a bond strength between the first and second layers may be greater than or equal to 150 g/in$^2$. The filter media may exhibit an air resistance increase of less than 50% after subjecting the filter media to an IPA vapor discharge compared to the filter media prior to the IPA vapor discharge.

In some embodiments as described above and/or herein, the filter media has an efficiency of greater than 95% according to standard EN1822:2009.

In some embodiments as described above and herein, the filter media may has an efficiency of greater than 99.95% according to standard EN1822:2009.

In some embodiments as described above and/or herein, the filter media has an efficiency of greater than 99.995% according to standard EN1822:2009.

In some embodiments as described above and/or herein, the filter media has an efficiency of greater than 99.9995% according to standard EN1822:2009.

In some embodiments as described above and herein, the fibers of the second layer are solvent-spun fibers.

In some embodiments as described above and herein, the fibers of the second layer are electrospun fibers or centrifugal spun fibers.

In some embodiments as described above and herein, the second layer is a main filter layer.

In some embodiments, as described above and herein, the filter media further comprises a third layer.

In some embodiments as described above and herein, the first layer is a wetlaid layer.

In some embodiments as described above and herein, the first layer is a support layer.

In some embodiments as described above and herein, the third layer is a meltblown layer.

In some embodiments as described above and herein, the third layer is a pre-filter layer.

In some embodiments as described above and herein, the third layer is a charged meltblown layer.

In some embodiments as described above and herein, the third layer is added in-line.

In some embodiments as described above and herein, the adhesive comprises water.

In some embodiments as described above and herein, the adhesive comprises a cross-linker.

In some embodiments as described above and herein, the adhesive has a glass transition temperature of greater than or equal to −150° C.

In some embodiments as described above and herein, the adhesive between the second layer and the third layer is present in an amount of less than 10 gsm.

In some embodiments as described above and herein, the filter media further comprise a fourth layer.

In some embodiments as described above and herein, the fibers of the fourth layer are solvent-spun fibers.

In some embodiments as described above and herein, the fibers of the fourth layer are electrospun fibers, centrifugal spun fibers.

In some embodiments as described above and herein, the fourth layer is a main filter layer.

In some embodiments as described above and herein, the filter media further comprises a fifth layer.

In some embodiments as described above and herein, the fifth layer is a meltblown layer.

In some embodiments as described above and herein, the fifth layer is a pre-filter layer.

In some embodiments as described above and herein, the value of gamma at the MPPS after being exposed to IPA vapor is greater than or equal to 14.

In some embodiments, a filter media comprising one or more layers (e.g., a two layer filter media, a three layer filter media, a five layer filter media, which may include, for example, a HEPA filter, an ULPA filter, or a HVAC filter) may be a component of a filter element. That is, the filter media may be incorporated into an article suitable for use by an end user. Non-limiting examples of suitable filter elements include flat panel filters, V-bank filters (comprising, e.g., between 1 and 24 Vs), cartridge filters, cylindrical filters, conical filters, and curvilinear filters. Filter elements may have any suitable height (e.g., between 2 inches and 24 inches for flat panel filters, between 4 inches and 124 inches for V-bank filters, between 1 inch and 124 inches for cartridge and cylindrical filter media). Filter elements may also have any suitable width (between 2 inches and 24 inches for flat panel filters, between 4 inches and 124 inches for V-bank filters). Some filter media (e.g., cartridge filter media, cylindrical filter media) may be characterized by a diameter instead of a width; these filter media may have a diameter of any suitable value (e.g., between 1 inch and 124 inches). Filter elements typically comprise a frame, which may be made of one or more materials such as cardboard, aluminum, steel, alloys, wood, and polymers.

In some embodiments, a filter media described herein may be a component of a filter element and may be pleated. The pleat depth and density may be selected as desired. For instance, filter media within flat panel or V-bank filters may have pleat depths between ¼ inch and 24 inches, and/or pleat densities between 1 and 50 pleats/inch. As another example, filter media within cartridge filters or conical filters may have pleat depths between ¼ inch and 24 inches and/or pleat densities between ½ and 100 pleats/inch. In some embodiments, pleats may be separated by a pleat separator made of, e.g., polymer, glass, aluminum, and/or cotton. In other embodiments, the filter element may lack a pleat separator. The filter media may be wire-backed, or it may be self-supporting.

Example 1

In this example, a five-layered filter media was fabricated where the layers were laminated together using a solvent-based adhesive.

Figure 3:
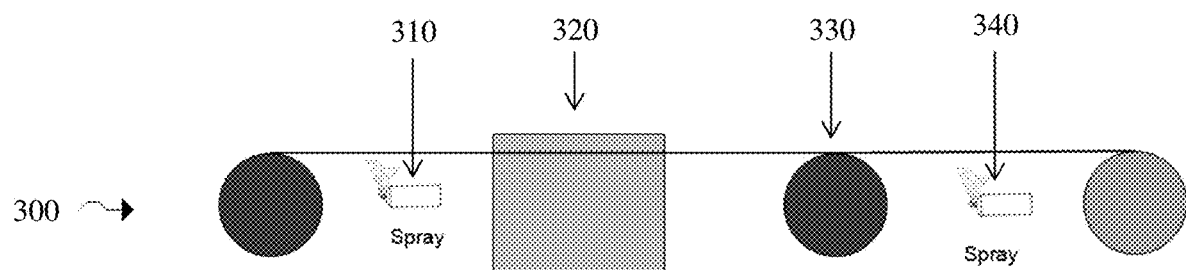
FIG. 3 shows a lamination process for forming a filter media according to some embodiments.
Figure 4A:
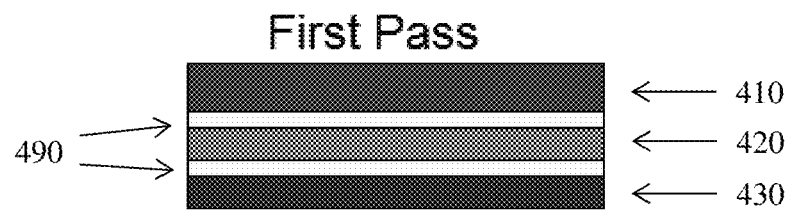
FIGS. 4A-4C show filter media that can be formed using the process shown in FIG. 3 according to some embodiments.

FIG. 3 shows a schematic of a system 300 used to form a filter media described herein. A solvent-based adhesive 310 (Super 77, a synthetic elastomer dissolved in acetone, cyclohexane, dimethyl glutarate, and other petroleum distillates; available from 3M corporation) was sprayed onto a first layer (a support layer) having a basis weight of 50 g/m². The adhesive coating had a basis weight of less than 10 g/m² (e.g., less than less than 1 g/m²). The adhesive-coated support layer then entered a spinning unit 320 (e.g., an electrospinning chamber), where a second layer (a nylon main filter layer) was added adjacent the adhesive. Next, a third layer (a spunbond pre-filter layer; trade name Reemay 2250), which was sprayed with an adhesive having a basis weight of less than 10 g/m² (e.g., less than less than 1 g/m²), was added by lamination via a winding unit 330 to form a three layer filter media. The resulting filter media formed during this first pass is shown in FIG. 4A and comprises a first layer 410, a second layer 420, a third layer 430, and an adhesive 490. Referring back to FIG. 3, an adhesive 340 was then applied to the third layer (a pre-filter layer) at a basis weight of less than 10 g/m² (e.g., less than less than 1 g/m²), and the three layer filter media was again passed through the spinning unit so that a fourth layer (a nylon main filter layer) was added adjacent the opposite side of the third layer. A fifth layer (a support layer) was sprayed with an adhesive and laminated so that its adhesive-coated side was adjacent the fourth layer in order to form a five layer filter media.

Figure 4B:
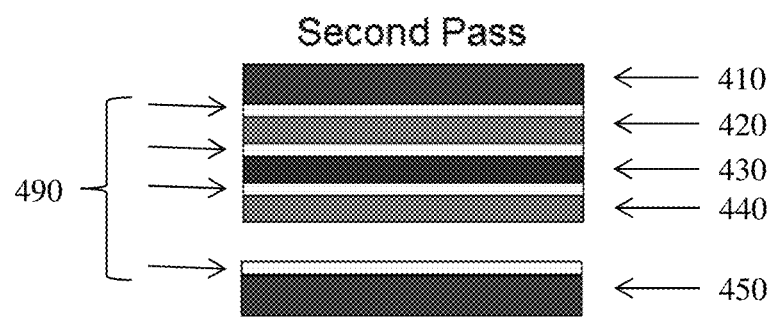
Figure 4C:
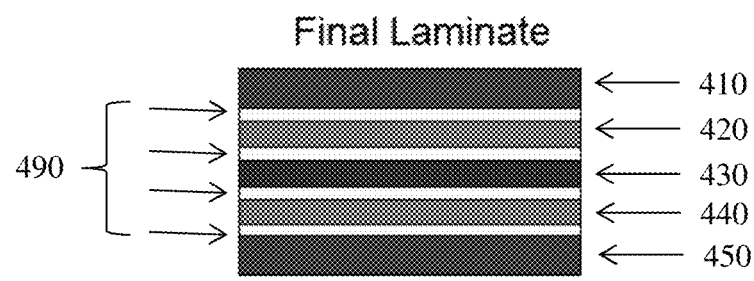

FIGS. 4A-4C show the resulting structures formed using the system and method described above. The filter media included first layer 410, second layer 420, third layer 430, a fourth layer 440, a fifth layer 440, and adhesive 490 (Filter Media 1).

For purposes of comparison, a four layered filter media (Filter Media 2) was fabricated by hand collating together two adhesive-free filter media, each of which was fabricated by electrospinning a second layer (a main filter layer) onto a first layer (a support layer). The hand collation was performed after each filter media had been wound once. The electrospun main filter layers of Filter Media 2 were similar in construction (e.g., fiber diameter, materials, and basis weight) to those of the main filter layers of Filter Media 1, and the support layers of Filter Media 2 were similar in construction (e.g., fiber diameter, materials, and basis weight) to those of the support layers of Filter Media 2. The spunbond pre-filter layer present in Filter Media 1 but absent in Filter Media 2 did not contribute significantly to Filter Media 1's gamma value due to its relatively low air resistance and high penetration compared to the other layers in the media.

Filter Media 1 had a higher value of gamma (59.1) than Filter Media 2 (45.1), showing that filter media formed by the method described in this example including a solvent-based adhesive outperformed filter media that did not include adhesives.

Example 2

This example describes the use of an adhesive comprising a small molecule cross-linker.

A two layer filter media was prepared by electrospinning a second layer (a main filter layer) with a basis weight of 0.2 g/m² onto a first layer (a support layer).

An adhesive composition was prepared by adding a carbodiimide cross-linker (Carbodilite E-02; available from Nisshinbo Chemicals) at different amounts (e.g., 0 wt %, 3 wt %, or 7 wt % cross-linker with respect to the total weight of the layer) to an aqueous acrylate copolymer adhesive having a glass transition temperature of −30° C. (Carbobond 1995; available from the Lubrizol Corporation).

The adhesive composition (comprising both Carbobond 1995 and the cross-linker) was sprayed onto a third layer (a polyester spunbond protective layer; trade name Reemay 2250) at 1 g/m². The adhesive-coated third layer was laminated to the two layer filter media at 80° C. and the air resistance of the resultant three layer filter media was measured. Then, the three layer filter media was exposed to IPA vapor as described above, after which the air resistance of the three layer filter media was again measured. The filter media comprising an adhesive composition comprising either 0 wt % cross-linker or 3 wt % cross-linker had significant increases in air resistance after being exposed to IPA vapor (3.7 mm $H_2O$ to 18.8 mm $H_2O$ for 0 wt % cross-linker, and 3.7 mm $H_2O$ to 9.4 mm $H_2O$ for 3 wt % cross-linker). The filter media comprising an adhesive composition comprising 7 wt % cross-linker exhibited a negligible increase in the air resistance after IPA vapor exposure (3.3 mm $H_2O$ to 4.1 mm $H_2O$).

Example 3

This example describes the fabrication of filter media.

An in-line spray nozzle system capable of applying adhesive in-line to filter media layers at several points during the fabrication process was custom built. A wetlaid synthetic media having 50 g/m² basis weight was used as a first layer (support layer) and was passed through the system and sprayed with adhesive. The adhesive-covered layer was then passed into an electrospinning line so that a second layer (a nylon electrospun main filter layer) was deposited adjacent the adhesive. The main filter layer had a basis weight of 0.25 g/m² and an average fiber diameter of 100 nm. These two layers were then collated with an adhesive-coated third layer (a 20 g/m² polypropylene meltblown web pre-filter layer) so that the adhesive on the meltblown pre-filter was adjacent the main filter layer. This multilayer media was passed through a felt dryer can maintained at a 120° C. surface temperature. The laminated media was wound into a roll and characterized.

The adhesive used above was Carbobond 1995 in combination with a Carbodilite cross linker. Carbobond 1995 was prepared at 15 wt % solids and blended with 10 wet wt % Carbodilite E02 cross-linker. The pH of the blend was adjusted to 7 to 8 using potassium hydroxide. 1.03 g/m² of adhesive was present at each interface in the final filter media (i.e., 1.03 g/m² of adhesive was present at the interface between the wetlaid layer and the main filter layer, and 1.03 g/m² of adhesive was present at the interface between the main filter layer and the meltblown layer.)

The three layer main filters fabricated as described above had an average internal bond strength of 343 g/in² and good bonding of three layers. These filter media also exhibited other positive properties after exposure to IPA vapor, such as a negligible increase in the air resistance (17.1 mm $H_2O$ to 17.8 mm $H_2O$), a negligible increase in the penetration at the MPPS (0.0044% to 0.01373%), and a relatively high value of gamma (22.7).

Example 4

This example describes the fabrication of a filter media as in Example 3.

A three layer filter media was made by employing a similar procedure to that used in Example 3.

A first layer (support layer) was a 60 g/m² synthetic wet-laid backer having a stiffness of 380 mg, a machine direction tensile strength of 25.7 lbs/in, a thickness 0.016 inches, and a Mullen dry strength of 70 psi.

The second layer (main filter layer) was fabricated from nylon fiber (electrospun fiber) with an average fiber diameter of −120 nm.

The third layer (pre-filter layer) was a meltblown polypropylene layer having basis weight of 22 g/m² and an average fiber diameter of 1.5 microns. The pre-filter layer was also corona charged so that it had an initial efficiency of 8.5% for 0.3 micron DOP particles measured at 5.32 cm/sec face velocity and a IPA vapor discharge efficiency of 65%.

The adhesive formulation was also similar to that employed in Example 3, except that it had 12.5 wt % solids. 0.8 g/m² of adhesive was added between each pair of layers (i.e., between the support layer and the main filter layer, and between the main filter layer and the pre-filter layer) for a total of 1.6 g/m² of adhesive for the filter media as a whole.

The filter media showed air resistance increase of 9% upon IPA vapor discharge, and a value of gamma of 18.89 after IPA vapor discharge. The average internal bond strength of the filter media was 189.4 g/in².

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A filter media, comprising:
   a first layer;
   a second layer, wherein the second layer is formed of fibers having an average fiber diameter of less than 1 micron; and
   an adhesive between the first layer and the second layer, wherein the first layer is bonded to the second layer by the adhesive,
   wherein the adhesive is cross-linked by a cross-linking agent,
   wherein the adhesive comprises an acrylate, comprises an acrylate copolymer, comprises a reaction product of a carboxylic acid group and the cross-linking agent, and/or is cross-linked by a reaction between the adhesive and a carbodiimide functional group present in the adhesive,
   wherein the filter media has a stiffness of greater than or equal to 200 mg,
   wherein a bond strength between the first and second layers is greater than or equal to 150 g/in$^2$,
   wherein the filter media exhibits a gamma value of greater than or equal to 18 at the most penetrating particle size.

2. A filter media, comprising:
   a first layer;
   a second layer, wherein the second layer is formed of fibers having an average fiber diameter of less than 1 micron; and
   an adhesive between the first layer and the second layer, wherein the first layer is bonded to the second layer by the adhesive,
   wherein the adhesive comprises a solvent-based resin comprising a polymer having a glass transition temperature of less than or equal to 24° C.,
   wherein the adhesive is cross-linked by a cross-linking agent, and
   wherein the adhesive comprises an acrylate, comprises an acrylate copolymer, comprises a reaction product of a carboxylic acid group and the cross-linking agent, and/or is cross-linked by a reaction between the adhesive and a carbodiimide functional group present in the adhesive.

3. A filter media, comprising:
   a first layer;
   a second layer, wherein the second layer is formed of fibers having an average fiber diameter of less than 1 micron; and
   an adhesive between the first layer and the second layer, wherein the adhesive between the first layer and the second layer is present in an amount of less than 10 gsm, wherein the first layer is bonded to the second layer by the adhesive, and wherein a bond strength between the first and second layers is greater than or equal to 150 g/in$^2$,
   wherein the adhesive is cross-linked by a cross-linking agent,
   wherein the adhesive comprises an acrylate, comprises an acrylate copolymer, comprises a reaction product of a carboxylic acid group and the cross-linking agent, and/or is cross-linked by a reaction between the adhesive and a carbodiimide functional group present in the adhesive, and
   wherein the filter media exhibits an air resistance increase of less than 50% after subjecting the filter media to an isopropyl alcohol (IPA) vapor discharge compared to the filter media prior to the IPA vapor discharge.

4. A filter media as in claim 1, wherein the fibers of the second layer are solvent-spun fibers.

5. A filter media as in claim 1, wherein the fibers of the second layer are electrospun fibers or centrifugal spun fibers.

6. A filter media as in claim 1, wherein the first layer is a wetlaid layer or support layer.

7. A filter media as in claim 1, wherein the filter media comprises a third layer.

8. A filter media as in claim 7, wherein the third layer is a meltblown layer.

9. A filter media as in claim 8, wherein the third layer is a charged meltblown layer.

10. A filter media as in claim 1, wherein the adhesive comprises water.

11. A filter media as in claim 1, wherein the adhesive has a glass transition temperature of greater than or equal to −150° C.

12. A filter media as in claim 7, further comprising an adhesive between the second layer and the third layer, and wherein the adhesive between the second layer and the third layer is present in an amount of less than 10 gsm.

13. A filter media as in claim 7, further comprising a fourth layer.

14. A filter media as in claim 13, wherein the fourth layer comprises fibers that are solvent-spun fibers.

15. A filter media as in claim 13, wherein the fourth layer comprises fibers that are electrospun fibers or centrifugal spun fibers.

16. A filter media as in claim 13, further comprising a fifth layer.

17. A filter media as in claim 16, wherein the fifth layer is a meltblown layer.

18. A filter media as in claim 1, wherein the value of gamma at the most penetrating particle size after being exposed to isopropyl alcohol vapor is greater than or equal to 14.

19. A filter media as in claim 1, wherein the adhesive is capable of undergoing a cross-linking reaction at greater than or equal to 24° C. and less than or equal to 150° C. and wherein the adhesive has a glass transition temperature of less than or equal to 24° C.

20. A filter media as in claim 1, wherein the cross-linking agent makes up greater than or equal to 5 wt % and less than or equal to 30 wt % of the adhesive.

21. A filter media as in claim 2, wherein the filter media has a stiffness of greater than or equal to 200 mg.

22. A filter media as in claim 2, wherein the fibers of the second layer are solvent-spun fibers.

* * * * *